(12) United States Patent
Zhang et al.

(10) Patent No.: US 11,958,011 B2
(45) Date of Patent: Apr. 16, 2024

(54) SEPARATION DEVICE AND SEPARATION METHOD

(71) Applicants: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

(72) Inventors: Shengzhong Zhang, Liaoning (CN); Ying Zhang, Liaoning (CN); Kai Qiao, Liaoning (CN); Dequan Fan, Liaoning (CN); Yanpeng Zhang, Liaoning (CN); Ming Gao, Liaoning (CN)

(73) Assignees: CHINA PETROLEUM & CHEMICAL CORPORATION, Beijing (CN); DALIAN RESEARCH INSTITUTE OF PETROLEUM AND PETROCHEMICALS, CORP., Liaoning (CN)

( * ) Notice: Subject to any disclaimer, the term of this patent is extended or adjusted under 35 U.S.C. 154(b) by 422 days.

(21) Appl. No.: 17/419,705

(22) PCT Filed: Dec. 26, 2019

(86) PCT No.: PCT/CN2019/128641
§ 371 (c)(1),
(2) Date: Jun. 29, 2021

(87) PCT Pub. No.: WO2020/140821
PCT Pub. Date: Jul. 9, 2020

(65) Prior Publication Data
US 2022/0080349 A1 Mar. 17, 2022

(30) Foreign Application Priority Data
Dec. 31, 2018 (CN) .......................... 201811652280.9

(51) Int. Cl.
*B01D 53/22* (2006.01)
*B01D 53/04* (2006.01)

(52) U.S. Cl.
CPC ....... *B01D 53/229* (2013.01); *B01D 53/0446* (2013.01); *B01D 2053/222* (2013.01);
(Continued)

(58) Field of Classification Search
None
See application file for complete search history.

(56) References Cited

U.S. PATENT DOCUMENTS

| 5,472,480 A | 12/1995 | Barbe |
| 6,017,454 A | 1/2000 | Hoerl et al. |

(Continued)

FOREIGN PATENT DOCUMENTS

| CN | 102824822 A | 12/2012 |
| CN | 203507773 U | 4/2014 |

(Continued)

OTHER PUBLICATIONS

WO9609877A1_ENG (Espacenet machine translation of Le Cloirec) (Year: 1996).*

*Primary Examiner* — Gabriel E Gitman
(74) *Attorney, Agent, or Firm* — NKL Law; Allen Xue

(57) ABSTRACT

A separation device includes a membrane separation module (10), an adsorption module (20), and a gas intake module (30). The membrane separation module includes a first housing (110), and a membrane assembly (130) disposed in the first housing. The first housing has a first gas inlet (121), a first gas outlet (122), and a retentate gas outlet (123). The membrane module has a permeate gas outlet, the permeate gas outlet being in communication with the first gas outlet.

(Continued)

The adsorption module has a second housing (210) and an adsorbent layer (230) disposed in it. The second housing is disposed on the first housing and has a second gas inlet (221), a second gas outlet (222), and a desorption gas outlet (223). The second gas inlet is in communication with the first gas outlet. The gas intake module has a third gas outlet (321) in communication with the first gas inlet.

14 Claims, 6 Drawing Sheets

(52) U.S. Cl.
CPC .............. *B01D 2259/40086* (2013.01); *B01D 2313/10* (2013.01); *B01D 2313/12* (2013.01); *B01D 2313/54* (2013.01); *B01D 2319/04* (2013.01)

(56) References Cited

U.S. PATENT DOCUMENTS

| | | |
|---|---|---|
| 6,027,546 A | 2/2000 | Kusters et al. |
| 2002/0110503 A1 | 8/2002 | Gittleman et al. |
| 2006/0090649 A1 | 5/2006 | Liu et al. |
| 2010/0074820 A1 | 3/2010 | Kimoto et al. |
| 2013/0000484 A1 | 1/2013 | Williams |
| 2014/0305309 A1 | 10/2014 | McKenna et al. |

FOREIGN PATENT DOCUMENTS

| | | | |
|---|---|---|---|
| CN | 204469531 U | 7/2015 | |
| CN | 106544062 A | 3/2017 | |
| CN | 206215000 U | 6/2017 | |
| CN | 108096990 A | 6/2018 | |
| CN | 108355462 A | 8/2018 | |
| EA | 001543 B1 | 4/2001 | |
| EA | 201201238 A1 | 2/2013 | |
| KR | 20100020102 A | 2/2010 | |
| WO | WO-9609877 A1 * | 4/1996 | ........... B01D 53/226 |

\* cited by examiner

SEPARATION DEVICE AND SEPARATION METHOD

CROSS REFERENCES TO RELATED APPLICATIONS

The present application is a U.S. national stage entry of International Application No. PCT/CN2019/128641, filed Dec. 26, 2019, which claims the priority to the Chinese Patent application CN 201811652280.9 submitted to China National Intellectual Property Administration on Dec. 31, 2018, which is entitled "SEPARATION DEVICE AND SEPARATION METHOD". The entire contents of the prior application are incorporated herein by reference.

TECHNICAL FIELD

The present invention relates to a separation device and a separation method.

BACKGROUND

High-purity gas (gas with molar purity higher than 99.90%) can be prepared by means of techniques such as tower separation, membrane separation and adsorption separation, etc. Preparing high-purity gas by membrane separation usually requires two stages of purification or even more stages of purification, which results in high production cost of high-purity gas. Especially, in a case that the concentration of the target gas component in the raw gas is low, the production cost of high-purity gas is higher, thus limits the application range of membrane separation.

At present, in a case that the concentration of the target gas component in the raw gas is low, usually the raw gas is coarsely purified with a membrane separation device, and then the coarsely purified gas is fed into an adsorption separation device to prepare high-purity gas.

SUMMARY

To solve the problems existing in the prior art, the present invention provides a separation device and a separation method.

To attain the above object, in a first aspect, the present invention provides a separation device, which comprises: a membrane separation module, which comprises a first housing and a membrane assembly that is able to be disposed in the first housing, wherein the first housing has a first gas inlet, a first gas outlet, and a retentate gas outlet, and the membrane assembly has a permeate gas outlet, the permeate gas outlet is in communication with the first gas outlet; an adsorption module, which comprises a second housing and an adsorbent layer that is able to be disposed in the second housing, wherein the second housing is disposed on the first housing and has a second gas inlet, a second gas outlet, and a desorption gas outlet, and the second gas inlet is in communication with the first gas outlet; and a gas intake module, which has a third gas outlet that is in communication with the first gas inlet.

The separation device according to the embodiments of the present invention has advantages such as a small footprint, light weight, and low manufacturing cost.

Optionally, the second housing is directly disposed on the first housing.

Optionally, the membrane separation module comprises a plurality of first gas inlets, each of which is in communication with the third gas outlet; optionally, the membrane separation module comprises a plurality of membrane assemblies and a plurality of first gas outlets, the adsorption module comprises a plurality of second gas inlets, wherein the permeate gas outlets of the plurality of membrane assemblies are in communication with the plurality of first gas outlets in one-to-one correspondence, and the plurality of first gas outlets are in communication with the plurality of second gas inlets in one-to-one correspondence.

Optionally, the gas intake module comprises: a gas intake pipe having a fourth gas outlet; and a gas distribution plate having a buffer cavity and a plurality of third gas outlets in communication with the buffer cavity respectively, the fourth gas outlet is in communication with the buffer cavity, wherein the membrane separation module comprises a plurality of first gas inlets, the plurality of third gas outlets are in communication with the plurality of first gas inlets in one-to-one correspondence.

Optionally, the separation device comprises a plurality of membrane separation modules and a plurality of adsorption modules, the first gas inlet of each of the membrane separation modules is in communication with the third gas outlet, a plurality of second housings are disposed on a plurality of first housings in one-to-one correspondence, and the first gas outlets of the plurality of membrane separation modules are in communication with the second gas inlets of the plurality of adsorption modules in one-to-one correspondence.

Optionally, the separation device comprises a plurality of gas intake modules, and the third gas outlets of the plurality of gas intake modules are in communication with the first gas inlets of the plurality of membrane separation modules in one-to-one correspondence.

Optionally, the gas intake module comprises: a gas intake manifold; a control valve having a third gas inlet and a plurality of third gas outlets, and the third gas inlets are switchably in communication with any one of the plurality of third gas outlets, wherein the gas intake manifold is connected with the third gas inlet; and a plurality of gas intake branch pipes, wherein first ends of the plurality of gas intake branch pipes are connected with the plurality of third gas outlets in one-to-one correspondence, and second ends of the plurality of gas intake branch pipes are connected with the first gas inlets of the plurality of membrane separation modules in one-to-one correspondence.

Optionally, the gas intake module comprises: a gas intake pipe having a fourth gas outlet; and a gas distribution plate having a plurality of buffer cavities, a plurality of third gas inlets, and a plurality of third gas outlets, the plurality of third gas inlets are in communication with the plurality of buffer cavities in one-to-one correspondence, and the plurality of third gas outlets are in communication with the plurality of buffer cavities in one-to-one correspondence, wherein the fourth gas outlets are switchably in communication with any one of the plurality of third gas inlets, and the plurality of third gas outlets are in communication with the first gas inlets of the plurality of membrane separation modules in one-to-one correspondence; optionally, the gas distribution plate is in an annular shape, the plurality of third gas inlets are disposed on the inner circumferential face of the gas distribution plate, wherein the gas distribution plate is able to be sleeved on a portion of the gas intake pipe provided with the fourth gas outlets, and the gas intake pipe is able to be rotatably arranged with respect to the gas distribution plate; optionally, each of the third gas outlets comprises a plurality of gas sub-outlets that constitute a plurality of gas sub-outlet groups arranged at an interval in the circumferential direction of the gas distribution plate, each of the gas sub-outlet groups comprises a plurality of gas sub-outlets arranged at an interval in the radial direction of the gas distribution plate, each of the membrane separation modules has a plurality of first gas inlets, and the plurality of first gas inlets of each of the membrane separation modules are in communication with the plurality of gas sub-outlets of the corresponding third gas outlet in one-to-one correspondence.

Optionally, the gas distribution plate comprises: an annular first plate body having a first end face provided with a plurality of buffer cavities, the inner ends of the buffer cavities are open to form the third gas inlets or the inner side wall faces of the buffer cavities are provided with the third gas inlets, wherein the first plate body is able to be sleeved on a portion of the gas intake pipe that is provided with the fourth gas outlets, and the gas intake pipe is able to be rotatably arranged with respect to the first plate body; and a second plate body that is disposed on the first end face and covers the plurality of buffer cavities, the third gas outlets are disposed on the second plate body and penetrate through the second plate body in the thickness direction of the second plate body.

Optionally, the gas distribution plate comprises: an annular first plate body having a first end face and a second end face that are opposite to each other in the thickness direction of the first plate body, the first plate body is provided with a plurality of buffer cavities, each of which penetrates through the first plate body in the thickness direction of the first plate body, and the inner ends of the buffer cavities are open to form the third gas inlets or the inner side wall faces of the buffer cavities are provided with the third gas inlets; and a second plate body and an annular third plate body, the second plate body is disposed on the first end face, the third plate body is disposed on the second end face, and the second plate body and the third plate body cover the plurality of buffer cavities, wherein the first plate body is able to be sleeved on the portion of the gas intake pipe that is provided with the fourth gas outlets, the gas intake pipe is able to be rotatably arranged with respect to the first plate body, the third gas outlets are disposed on the second plate body, and penetrate through the second plate body in the thickness direction of the second plate body.

Optionally, the plurality of membrane separation modules are arranged in a first circumferential direction, and the first housing comprises: a first end plate and a second end plate; and a first side plate, a second side plate, a first inner side plate, and a first outer side plate, wherein the first side plate, the first inner side plate, the second side plate, and the first outer side plate are connected sequentially to form a first enclosure plate, a first end of the first enclosure plate is connected with the first end plate, and a second end of the first enclosure plate is connected with the second end plate, wherein the first gas inlet is disposed on the first end plate, the first gas outlet is disposed on the second end plate, and the retentate gas outlet is disposed on at least one of the first enclosure plate and the first end plate; optionally, the first end plates of the plurality of membrane separation modules are formed integrally, and the second end plates of the plurality of membrane separation modules are formed integrally; optionally, the first side plate of one of two first housings adjacent to each other in first circumferential direction is integrally formed with the second side plate of the other of the two first housings; optionally, the first inner side plates of the plurality of membrane separation modules are formed integrally, and the first outer side plates of the plurality of membrane separation modules are formed integrally; optionally, the first end of each of the membrane assemblies is connected with the corresponding first end plate, the second end of each of the membrane assemblies is open to form the permeate gas outlet, and the second end of each of the membrane assemblies is connected with the first gas outlet on the corresponding second end plate; optionally, the first inner side plates of the plurality of membrane separation modules are located on a first right cylindrical surface or a first regular prismatic surface, and the first outer side plates of the plurality of membrane separation modules are located on a second right cylindrical surface or a second regular prismatic surface.

Optionally, the plurality of adsorption modules are arranged in the first circumferential direction, and the second housing comprises: a third end plate and a fourth end plate; and a third side plate, a fourth side plate, a second inner side plate, and a second outer side plate, wherein the third side plate, the second inner side plate, the fourth side plate, and the second outer side plate are connected sequentially to form a second enclosure plate, a first end of the second enclosure plate is connected with the third end plate, and a second end of the second enclosure plate is connected with the fourth end plate, wherein the second gas inlet is arranged on the third end plate, the second gas outlet is arranged on the fourth end plate, and the desorption gas outlet is arranged on at least one of the second enclosure plate and the third end plate; optionally, the third end plates of the plurality of adsorption modules are formed integrally, the fourth end plates of the plurality of adsorption modules are formed integrally; optionally, the third side plate of one of two second housings adjacent to each other in the first circumferential direction is integrally formed with the fourth side plate of the other of the two second housings; optionally, the second inner side plates of the plurality of adsorption modules are formed integrally, and the second outer side plates of the plurality of adsorption modules are formed integrally; optionally, the second inner side plates of the plurality of adsorption modules are located on a third right cylindrical surface or a third regular prismatic surface, the second outer side plates of the plurality of adsorption modules are located on a fourth right cylindrical surface or a fourth regular prismatic surface; further optionally, the first right cylindrical surface and the third right cylindrical surface are the same right cylindrical surface, the second right cylindrical surface and the fourth right cylindrical surface are the same right cylindrical surface, the first regular prismatic surface and the third regular prismatic surface are the same regular prismatic surface, and the second regular prismatic surface and the fourth regular prismatic surface are the same regular prismatic surface.

Optionally, the separation device further comprises a central shaft, wherein the plurality of membrane separation modules are able to be arranged in the circumferential direction of the central shaft, the plurality of adsorption modules are able to be arranged in the circumferential direction of the central shaft, wherein the first inner side plate of the membrane separation module is close to the central shaft or the first inner side plate of the membrane separation module contacts with the central shaft, the second inner side plate of each adsorption module is close to the central shaft or the second inner side plate of each adsorption module contacts with the central shaft.

In a second aspect, the present invention provides a separation method implemented with the separation device according to the first aspect of the present invention, which comprises the following steps: utilizing the gas intake module to supply raw gas to the membrane separation module; utilizing the membrane separation module to carry out separation of the raw gas so as to obtain coarsely purified gas; and utilizing the adsorption module to absorb the impurities or target gas in the coarsely purified gas so as to obtain high-purity gas.

Optionally, making the fourth gas outlet of the gas intake pipe in communication with the third gas inlets of a group of buffer cavities of the gas distribution plate so as to supply the raw gas to a group of membrane separation modules, wherein the group of buffer cavities comprise at least one buffer cavity, and the group of membrane separation modules comprise at least one membrane separation module; utilizing the group of membrane separation modules to carry out separation of the raw gas so as to obtain the coarsely purified gas; utilizing a group of adsorption modules to absorb the impurities or target gas in the coarsely purified gas so as to obtain high-purity gas, wherein the group of adsorption modules comprise at least one adsorption module; after the group of adsorption modules operate for a preset time or the group of adsorption modules process a preset amount of the coarsely purified gas, making the fourth gas outlet of the gas intake pipe in communication with the third gas inlets of another group of buffer cavities of the gas distribution plate, so as to supply the raw gas to said another group of membrane separation modules, wherein said another group of buffer cavities comprise at least one buffer cavity, and said another group of membrane separation modules comprise at least one membrane separation module; utilizing another group of membrane separation modules to carry out separation of the raw gas so as to obtain the coarsely purified gas; utilizing another group of adsorption modules to absorb the impurities or target gas in the coarsely purified gas so as to obtain high-purity gas, wherein said another group of adsorption modules comprise at least one adsorption module; and regenerating the adsorbent in the group of adsorption modules.

Figure 1:
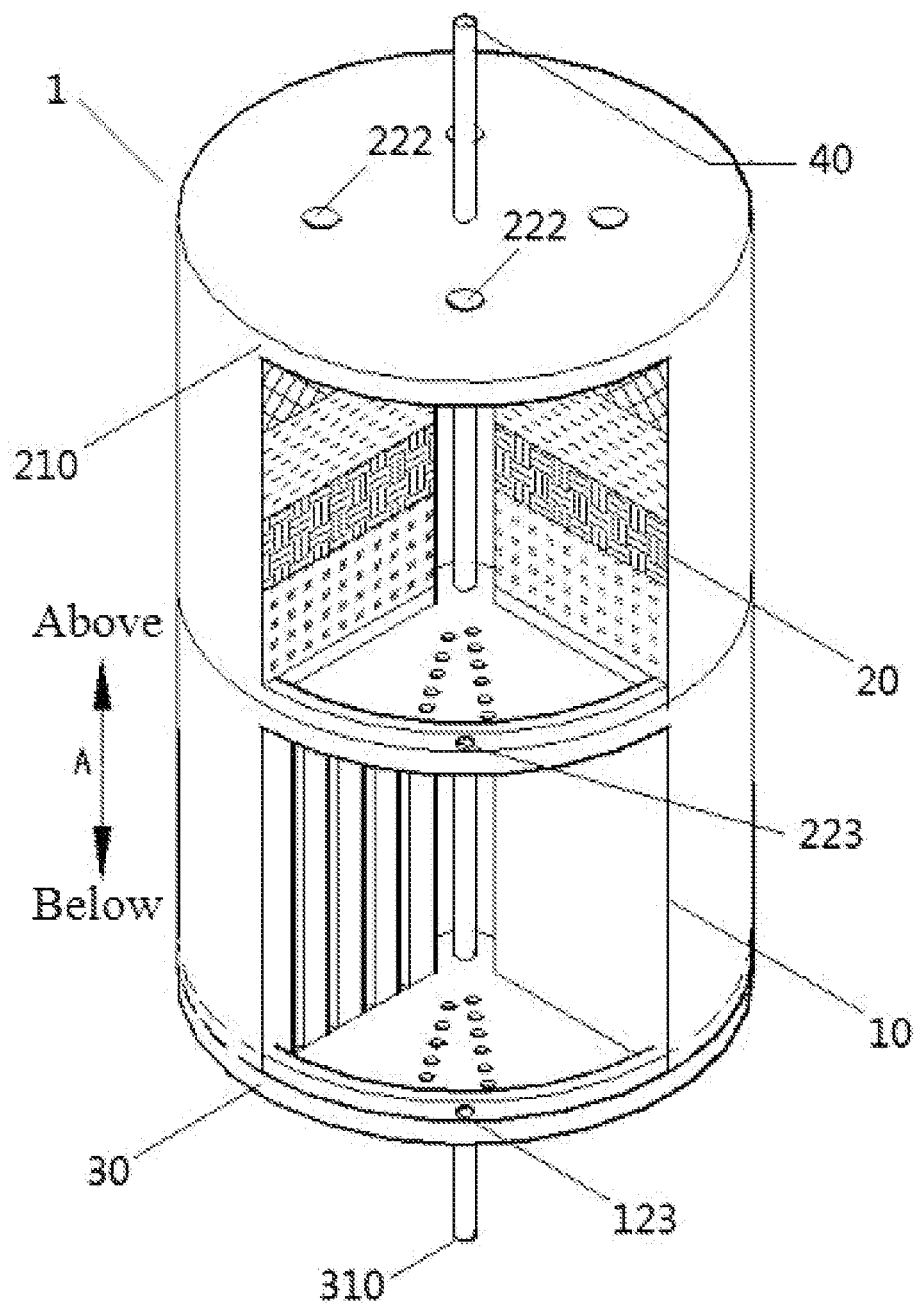
FIG. 1 is a partial schematic structural diagram of the separation device according to the embodiments of the present invention.

1—separation device;
10—membrane separation module, 110—first housing, 111—first end plate, 112—second end plate, 113—first side plate, 114—second side plate, 115—first inner side plate, 116—first outer side plate, 117—first enclosure plate, 118—first accommodating cavity,
121—first gas inlet, 122—first gas outlet, 123—retentate gas outlet, 130—membrane assembly, 20—adsorption module, 210—second housing, 211—third end plate, 212—fourth end plate, 2121—through-hole, 213—third side plate, 214—fourth side plate, 215—second inner side plate, 216—second outer side plate, 217—second enclosure plate, 218—second accommodating cavity,
221—second gas inlet, 222—second gas outlet, 223—desorption gas outlet, 230—adsorbent layer, 30—gas intake module, 310—gas intake pipe, 311—fourth gas outlet,
320—gas distribution plate, 321—third gas outlet, 3211—gas sub-outlet, 322—buffer cavity, 323—third gas inlet, 324—first plate body, 3241—first end face, 325—second plate body, 40—central shaft

DETAILED DESCRIPTION

Hereunder some embodiments of the present invention will be detailed, and examples of the embodiments are shown in the accompanying drawings. It should be noted that the embodiments described with reference to the accompanying drawings are only exemplary and are provided only to explain the present invention rather than constitute any limitation to the present invention. Hereunder the separation device 1 according to the embodiments of the present invention will be described with reference to the accompanying drawings. As shown in FIGS. 1-6, the separation device 1 according to the embodiments of the present invention comprises a membrane separation module 10, an adsorption module 20, and a gas intake module 30.

The membrane separation module 10 comprises a first housing 110 and a membrane assembly 130 that can be disposed in the first housing 110, wherein the first housing 110 has a first gas inlet 121, a first gas outlet 122, and a retentate gas outlet 123. The membrane assembly 130 has a permeate gas outlet, the permeate gas outlet is in communication with the first gas outlet 122. The adsorption module 20 comprises a second housing 210 and an adsorbent layer 230 that can be disposed in the second housing 210, the second housing 210 is disposed on the first housing 110, i.e., the first housing 110 is disposed on the second housing 210. The second housing 210 has a second gas inlet 221, a second gas outlet 222, and a desorption gas outlet 223, wherein the second gas inlet 221 is in communication with the first gas outlet 122. The gas intake module 30 has a third gas outlet 321, the third gas outlet 321 is in communication with the first gas inlet 121.

The expression "the membrane assembly 130 can be disposed in the first housing 110" refers to that the membrane assembly 130 is disposed in the first housing 110 when the separation device 1 is utilized to prepare high-purity gas; the expression "the adsorbent layer 230 can be disposed in the second housing 210" refers to that the adsorbent layer 230 is disposed in the second housing 210 when the separation device 1 is utilized to prepare high-purity gas. The membrane assembly 130 may or may not be disposed in the first housing 110, and the adsorbent layer 230 may or may not be disposed in the second housing 210, when the separation device 1 is not used to prepare high-purity gas.

When the separation device 1 is used to prepare high-purity gas, the raw gas (a gas mixture containing the target gas) enters into the membrane separation module 10 through the third gas outlet 321 of the gas intake module 30 and the first gas inlet 121 of the membrane separation module 10 sequentially, and the raw gas is separated by the membrane separation module 10 (coarse purification) to obtain coarsely purified gas. The gas that permeates through the membrane assembly 130 is the coarsely purified gas, and the gas that can't permeates through the membrane assembly 130 is retentate gas, the retentate gas may be discharged from the membrane separation module 10 through the retentate gas outlet 123. The coarsely purified gas enters into the adsorption module 20 through the first gas outlet 122 of the membrane separation module 10 and the second gas inlet 221 of the adsorption module 20 sequentially, and the impurities in the coarsely purified gas are absorbed by the adsorption module 20 so as to obtain high-purity gas.

The existing devices for preparing high-purity gas simply connect and combine existing membrane separation device and adsorption device in tandem according to the material properties, without modification to the structures of the membrane separation device and the adsorption device.

The separation device 1 according to the embodiments of the present invention realizes integration of the membrane separation module 10 and the adsorption module 20 by integrating the first housing 110 of the membrane separation module 10 and the second housing 210 of the adsorption module 20. Thus, the footprint and weight of the separation device 1 can be greatly reduced. Since the separation device 1 according to the embodiments of the present invention has a very small footprint, it is especially suitable for use in a gas station (e.g., a hydrogen refueling station). The separation device 1 according to the embodiments of the present invention has a small footprint advantage that is incomparable in existing separation devices.

Therefore, the separation device 1 according to the embodiments of the present invention has advantages such as small footprint, light weight, and low manufacturing cost, etc.

As shown in FIGS. 1-6, in some embodiments of the present invention, the separation device 1 comprises a membrane separation module 10, an adsorption module 20, and a gas intake module 30. The separation device 1 can be widely used for preparation of high-purity gas. For example, the separation device 1 may be used to prepare high-purity argon, hydrogen, oxygen, nitrogen, carbon monoxide, carbon dioxide, and methane, etc.

The membrane separation module 10 comprises a first housing 110 and a membrane assembly 130 that can be disposed in the first housing 110, wherein the first housing 110 has a first gas inlet 121, a first gas outlet 122, and a retentate gas outlet 123. The adsorption module 20 comprises a second housing 210 and an adsorbent layer 230 that can be disposed in the second housing 210, and the second housing 210 has a second gas inlet 221, a second gas outlet 222, and a desorption gas outlet 223.

The membrane assembly 130 may be an inorganic membrane assembly or organic membrane assembly. An inorganic membrane assembly is applicable to scenarios that the raw gas contains liquid or acid gas, or condensate may be produced during temperature and/or pressure change. The inorganic membrane of the inorganic membrane assembly may be a hollow molecular sieve membrane, such as carbon molecular sieve, LTA molecular sieve or DDR molecular sieve membrane, etc. An organic membrane assembly is applicable to scenarios that the raw gas doesn't contain liquid and no condensate is produced in the raw gas or product gas during temperature and/or pressure change. The organic membrane of the organic membrane assembly may be a hollow fiber membrane.

The adsorbent layer 230 may comprise adsorbents that can absorb different impurities, depending on the composition of the impurities in the coarsely purified gas. For example, the adsorbent layer 230 may comprise at least one of activated alumina, silica gel, zeolite molecular sieve and activated carbon.

Figure 4A:
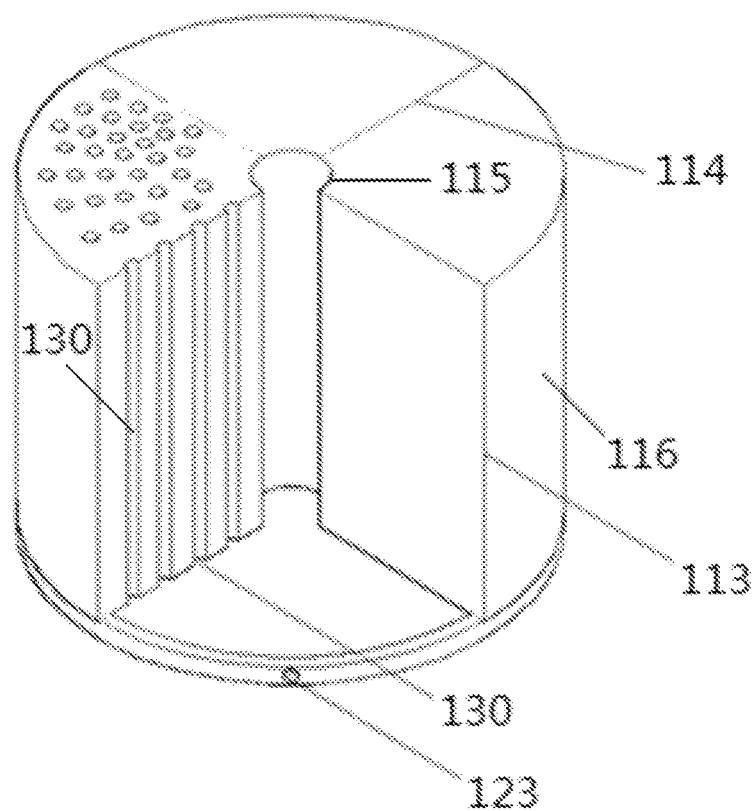
FIG. 4a is a partial schematic structural diagram of the membrane separation module of the separation device according to the embodiments of the present invention.
Figure 4B:
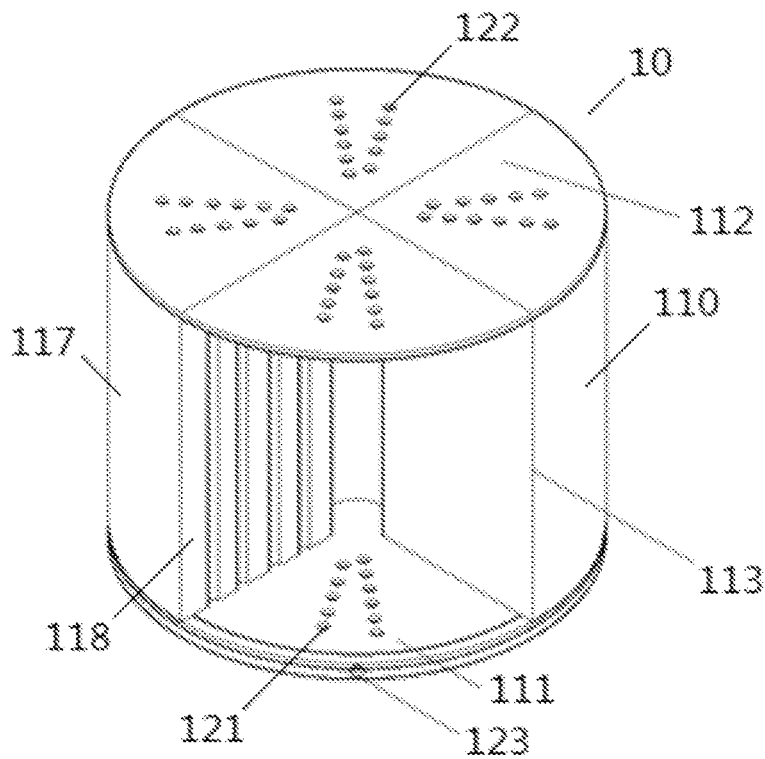
FIG. 4b is a partial schematic structural diagram of the membrane separation module of the separation device according to the embodiments of the present invention.

Optionally, as shown in FIGS. 1 and 4b, the first housing 110 may have a plurality of first gas inlets 121, each of which is in communication with the third gas outlet 321 so that the raw gas flows though (enters into) each first gas inlet 121. Thus, the raw gas can enter into the first housing 110 more uniformly, and the gas processing capacity of the membrane separation module 10 in unit time is improved.

As shown in FIGS. 1, 4a and 4b, the membrane separation module 10 may comprise a plurality of membrane assemblies 130, the first housing 110 may have a plurality of first gas outlets 122, and the permeate gas outlets of a plurality of membrane assemblies 130 may be in communication with the plurality of first gas outlets 122 in one-to-one correspondence. That is to say, the quantity of the permeate gas outlets (membrane assemblies 130) may be equal to the quantity of the first gas outlets 122, each permeate gas outlet is in communication with a first gas outlet 122, and each first gas outlet 122 is in communication with a permeate gas outlet. Thus, the gas processing capacity of the membrane separation module 10 in unit time can be further improved.

Figure 5A:
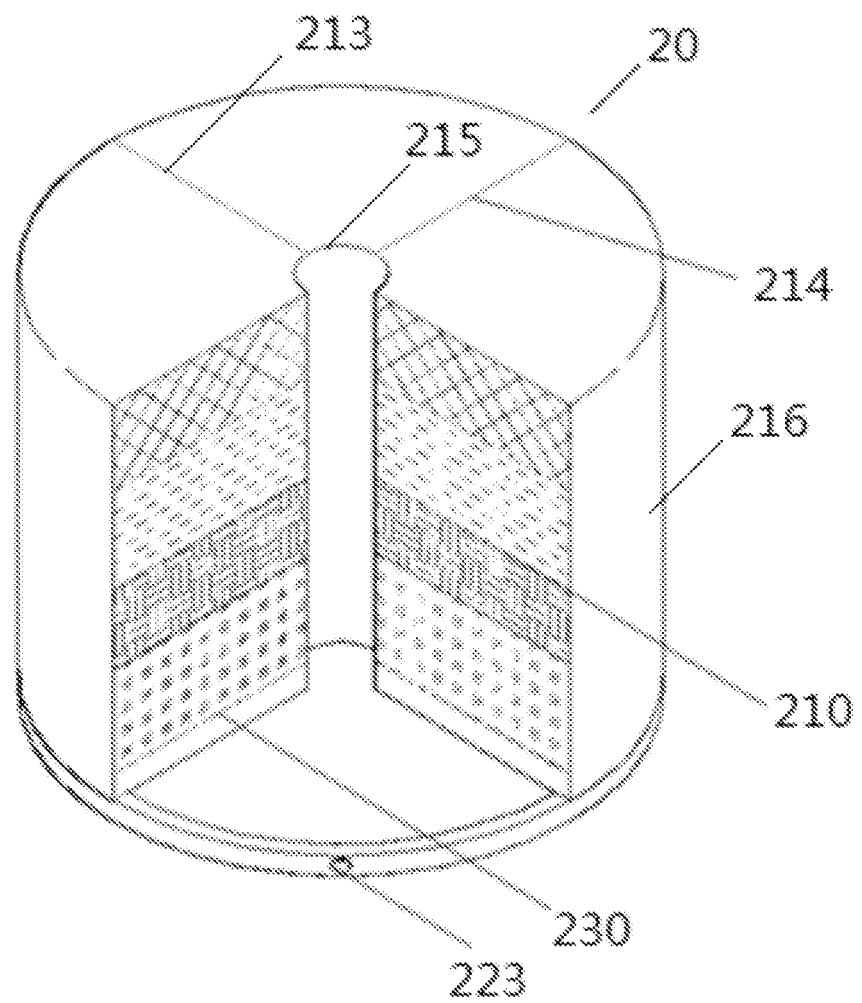
FIG. 5a is a partial schematic structural diagram of the adsorption module of the separation device according to the embodiments of the present invention.
Figure 5B:
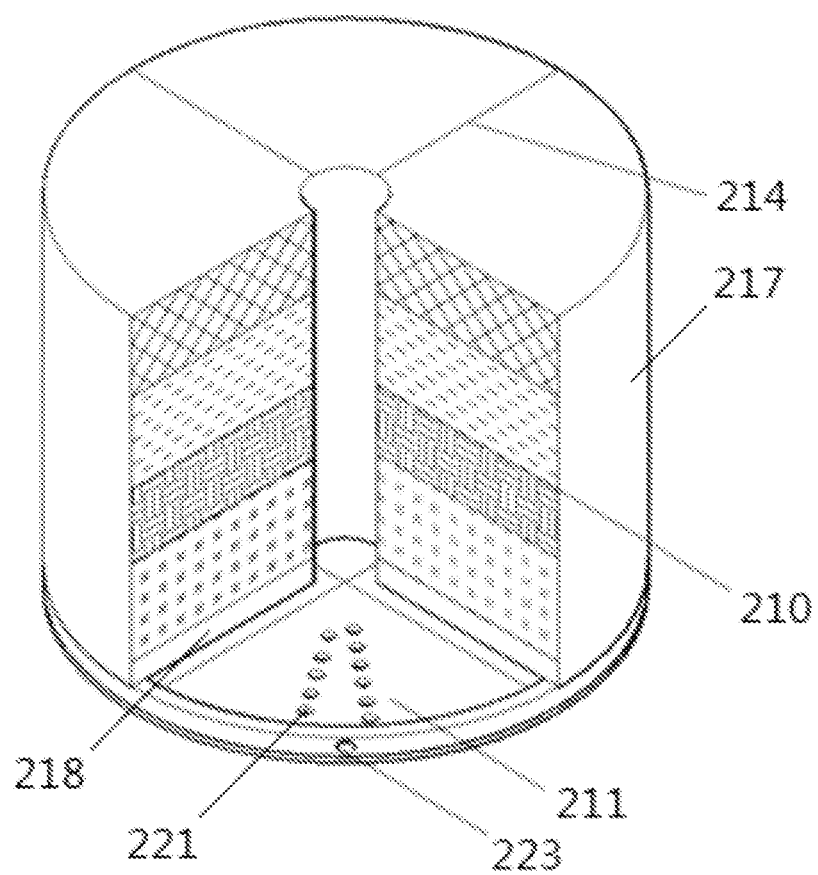
FIG. 5b is a partial schematic structural diagram of the adsorption module of the separation device according to the embodiments of the present invention.

Accordingly, as shown in FIGS. 1 and 5b, the second housing 210 has a plurality of second gas inlets 221, and a plurality of first gas outlets 122 are in communication with the plurality of second gas inlets 221 in one-to-one correspondence. That is to say, the quantity of the second gas inlets 221 may be equal to the quantity of the first gas outlets 122, each second gas inlet 221 is in communication with a first gas outlet 122, and each first gas outlet 122 is in communication with a second gas inlet 221. Thus, the gas processing capacity of the adsorption module 20 in unit time can be further improved.

As shown in FIG. 1, in an embodiment of the present invention, the second housing 210 is disposed directly above the first housing 110. That is to say, no component (e.g., connecting plate, bracket, etc.) is arranged between the first housing 110 and the second housing 210, but the first housing 110 and the second housing 210 are in direct contact with each other. Thus, the structure of the separation device 1 is further simplified, the degree of integration of the membrane separation module 10 with the adsorption module 20 is further improved, and thereby the footprint of the separation device 1 can be further decreased, and the weight and manufacturing cost of the separation device 1 can be further reduced. Of course, in other embodiments, the first housing 110 may be disposed above the second housing 210.

Figure 2A:
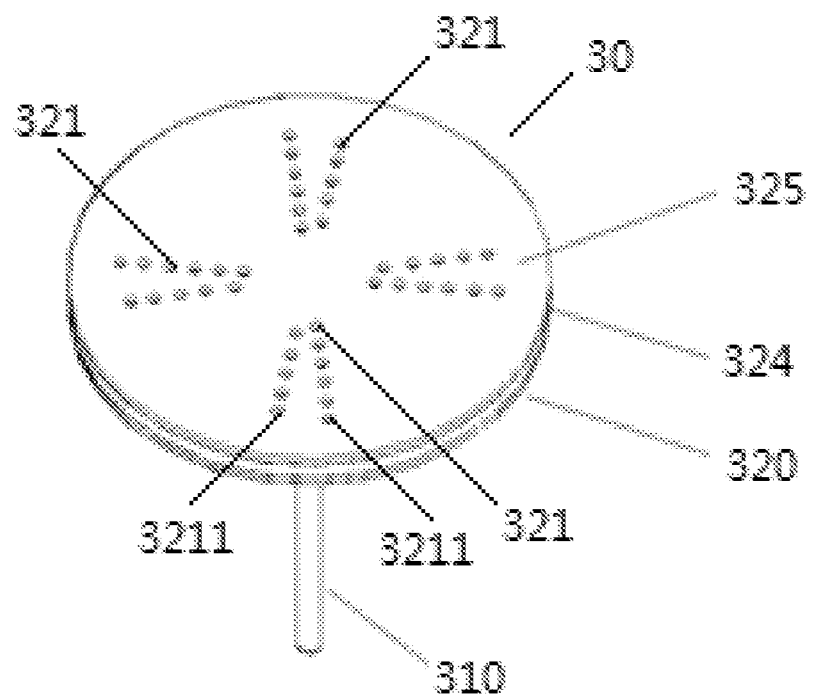
FIG. 2a is a schematic structural diagram of the gas intake module of the separation device according to the embodiments of the present invention.
Figure 2B:
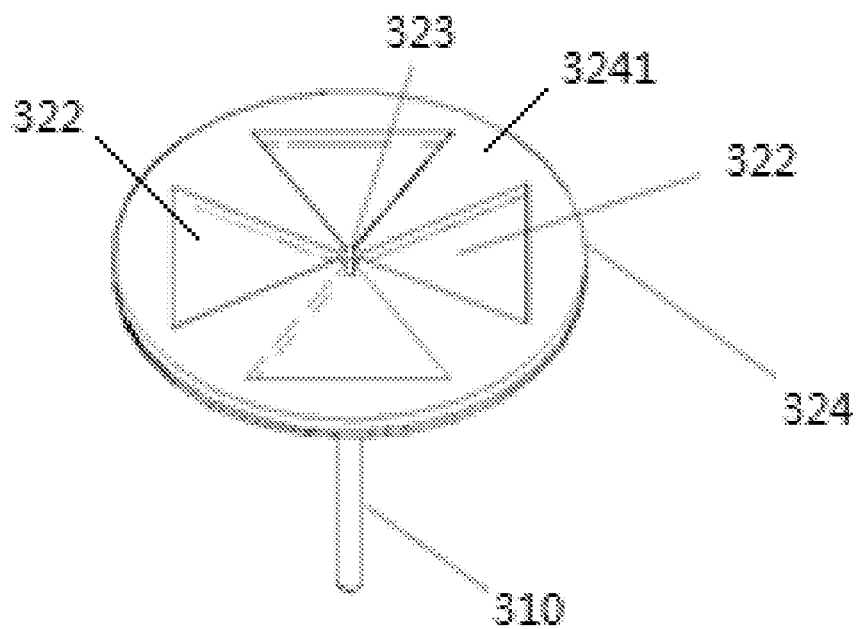
FIG. 2b is a partial schematic structural diagram of the gas intake module of the separation device according to the embodiments of the present invention.
Figure 2C:
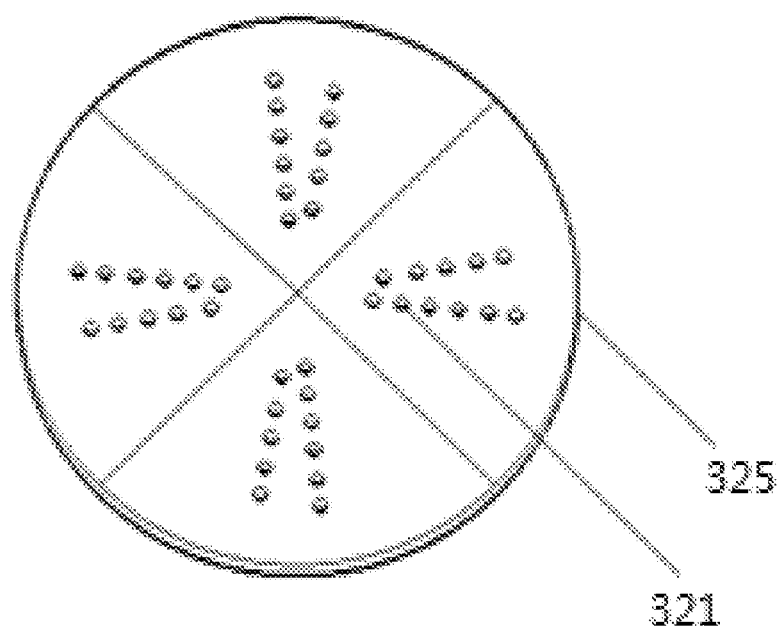
FIG. 2c is a schematic structural diagram of the gas distribution plate of the separation device according to the embodiments of the present invention.
Figure 3:
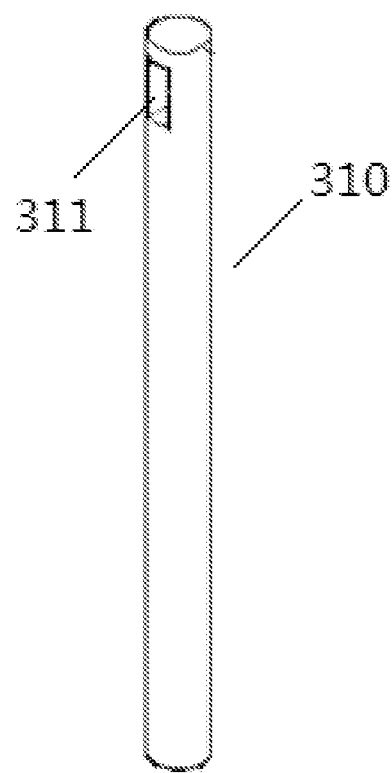
FIG. 3 is a schematic structural diagram of the gas intake pipe of the separation device according to the embodiments of the present invention.

The gas intake module 30 has a third gas outlet 321, the third gas outlet 321 is in communication with the first gas inlet 121. As shown in FIGS. 2a-2c, the gas intake module 30 comprises a gas intake pipe 310 and a gas distribution plate 320, and the gas intake pipe 310 has a fourth gas outlet 311. The gas distribution plate 320 has a buffer cavity 322 and a plurality of third gas outlets 321, each third gas outlet 321 is in communication with the buffer cavity 322, and the fourth gas outlet 311 is in communication with the buffer cavity 322. Optionally, the top end of the gas intake pipe 310 is closed.

The membrane separation module 10 has a plurality of first gas inlets 121, and the plurality of third gas outlets 321 are in communication with the plurality of first gas inlets 121 in one-to-one correspondence. In other words, the quantity of the third gas outlets 321 may be equal to the quantity of the first gas inlets 121, each third gas outlet 321 is in communication with a first gas inlet 121, and each first gas inlet 121 is in communication with a third gas outlet 321.

The raw gas enters into the buffer cavity 322 through the fourth gas outlet 311 of the gas intake pipe 310, and the raw gas in the buffer cavity 322 enters into the first housing 110 through the plurality of third gas outlets 321 and the plurality of first gas inlets 121 sequentially. By arranging the buffer cavity 322 in communication with the fourth gas outlet 311 and the plurality of third gas outlets 321 in communication with the buffer cavity 322 on the gas distribution plate 320, the flow speed of the raw gas can be decreased by means of the buffer cavity 322, the raw gas can enter into the first housing 110 more uniformly, and the gas processing capacity of the membrane separation module 10 in unit time can be improved.

As shown in FIGS. 1-6, in some embodiments of the present invention, the separation device 1 may comprise a plurality of membrane separation modules 10 and a plurality of adsorption modules 20. The first gas inlet 121 of each membrane separation module 10 is in communication with the third gas outlet 321, so that the raw gas can enter into the first housing 110 of each membrane separation module 10.

The plurality of second housings 210 are arranged on the plurality of first housings 110 in one-to-one correspondence. That is to say, the quantity of the membrane separation modules 10 (first housings 110) may be equal to the quantity of the adsorption modules 20 (second housings 210), and each second housing 210 is arranged on a first housing 110. Optionally, the plurality of second housings 210 are directly arranged on the plurality of first housings 110 in one-to-one correspondence.

The first gas outlets 122 of the plurality of membrane separation modules 10 are in communication with the second gas inlets 221 of the plurality of adsorption modules 20 in one-to-one correspondence. That is to say, the first gas outlet 122 of each membrane separation module 10 is in communication with the second gas inlet 221 of an adsorption module 20, and the second gas inlet 221 of each adsorption module 20 is in communication with the first gas outlet 122 of a membrane separation module 10. Thus, the membrane separation modules 10 and the adsorption modules 20, which are associated to each other, can form a separation assembly capable of preparing high-purity gas, and the separation device 1 may comprise a plurality of separation assemblies, thus the gas processing capacity of the separation device 1 in unit time can be greatly improved.

As shown in FIGS. 4a and 4b, a plurality of membrane separation modules 10 may be disposed in a first circumferential direction, which is to say, a plurality of membrane separation modules 10 may be arranged in the first circumferential direction. Each first housing 110 may comprise a first end plate 111, a second end plate 112, a first side plate 113, a second side plate 114, a first inner side plate 115 and a first outer side plate 116. "Inward" refers to orientation to the central part of the first circumferential direction, while "outward" refers to orientation away from the central part of the first circumferential direction.

The first side plate 113, the first inner side plate 115, the second side plate 114 and the first outer side plate 116 are connected sequentially to form a first enclosure plate 117, the first end of the first enclosure plate 117 is connected with the first end plate 111, and the second end of the first enclosure plate 117 is connected with the second end plate 112.

Specifically, the first end plate 111 and the second end plate 112 are spaced apart from each other in the vertical direction, the bottom end of the first enclosure plate 117 is connected with the first end plate 111, and the top end of the first enclosure plate 117 is connected with the second end plate 112. That is to say, the bottom end of each of the first side plate 113, the first inner side plate 115, the second side plate 114 and the first outer side plate 116 is connected with the first end plate 111, and the top end of each of the first side plate 113, the first inner side plate 115, the second side plate 114, and the first outer side plate 116 is connected with the second end plate 112. The vertical direction is indicated by the arrow A in FIG. 1.

The first end plate 111, the second end plate 112, the first side plate 113, the second side plate 114, the first inner side plate 115 and the first outer side plate 116 may define a first accommodating cavity 118. That is to say, the first housing 110 may have a first accommodating cavity 118. The membrane assembly 130 is disposed in the first accommodating cavity 118, and each of the first gas inlet 121, the first gas outlet 122 and the retentate gas outlet 123 may be in communication with the first accommodating cavity 118.

Wherein, the first gas inlet 121 may be disposed on the first end plate 111, the first gas outlet 122 may be disposed on the second end plate 112, and the retentate gas outlet 123 may be disposed on at least one of the first enclosure plate 117 and the first end plate 111. Optionally, the retentate gas outlet 123 may be disposed on the lower portion of the first enclosure plate 117. For example, the retentate gas outlet 123 may be disposed on the lower part of the first outer side plate 116.

The first end plates 111 of the plurality of membrane separation modules 10 may be formed integrally, and the second end plates 112 of the plurality of membrane separation modules 10 may be formed integrally. Thus, the structure of the separation device 1 can be further simplified, the integration degree and structural strength of the separation device 1 can be further improved, and the difficulty in assembling of the separation device 1 can be further reduced.

Optionally, the first side plate 113 of one of two first housings 110 adjacent to each other in the first circumferential direction is integrally formed with the second side plate 114 of the other of the two first housings 110. In other words, for two first housings 110 adjacent to each other in the first circumferential direction, the first side plate 113 of one first housing 110 is integrally formed with the second side plate 114 of the other first housing 110, which is to say, the two first housings 110 adjacent to each other in the first circumferential direction can share the same side plate. Thus, the structure of the separation device 1 can be further simplified, the integration degree of the separation device 1 can be further improved, and the structural strength of the separation device 1 can be further improved.

A first end (e.g., bottom end) of each membrane assembly 130 is connected with a corresponding first end plate 111. A second end (e.g., top end) of each membrane assembly 130 is open to form the permeate gas outlet, and the second end of each membrane assembly 130 is connected with the first gas outlet 122 on the corresponding second end plate 112. The corresponding first end plate 111 and the corresponding second end plate 112 refer to the first end plate 111 and the second end plate 112 that belong to the same membrane separation module 10 as the membrane assembly 130. The first inner side plates 115 of the plurality of membrane separation modules 10 are located on a first right cylindrical surface or a first regular prismatic surface, which is to say, the first inner side plates 115 of the plurality of membrane separation modules 10 are located on the same right cylindrical surface or the same regular prismatic surface. The first outer side plates 116 of the plurality of membrane separation modules 10 are located on a second right cylindrical surface or a second regular prismatic surface, that is to say, the first outer side plates 116 of the plurality of membrane separation modules 10 are located on the same right cylindrical surface or the same regular prismatic surface. Thus, the structure of the separation device 1 is more reasonable. The right cylindrical surface refers to the side of a right cylinder, and the regular prismatic surface refers to a side of a regular prism.

Optionally, the first inner side plates 115 of the plurality of membrane separation modules 10 may be formed integrally, and the first outer side plates 116 of the plurality of membrane separation modules 10 may be formed integrally. Thus, the structure of the separation device 1 can be further simplified, the integration degree of the separation device 1 can be further improved, and the structural strength of the separation device 1 can be further improved.

As shown in FIGS. 5a and 5b, a plurality of adsorption modules 20 may be disposed in the first circumferential direction, which is to say, a plurality of adsorption modules 20 may be arranged in the first circumferential direction. Each second housing 210 comprises a third end plate 211, a fourth end plate 212, a third side plate 213, a fourth side plate 214, a second inner side plate 215, and a second outer side plate 216. The third side plate 213, the second inner side plate 215, the fourth side plate 214, and the second outer side plate 216 are connected sequentially to form a second enclosure plate 217, a first end of the second enclosure plate 217 is connected with the third end plate 211, and a second end of the second enclosure plate 217 is connected with the fourth end plate 212.

Specifically, the third end plate 211 and the fourth end plate 212 are spaced apart from each other in the vertical direction, the bottom end of the second enclosure plate 217 is connected with the third end plate 211, and the top end of the second enclosure plate 217 is connected with the fourth end plate 212. That is to say, the bottom end of each of the third side plate 213, the second inner side plate 215, the fourth side plate 214 and the second outer side plate 216 is connected with the third end plate 211, and the top end of each of the third side plate 213, the second inner side plate 215, the fourth side plate 214, and the second outer side plate 216 is connected with the fourth end plate 212.

The third end plate 211, the fourth end plate 212, the third side plate 213, the fourth side plate 214, the second inner side plate 215, and the second outer side plate 216 may define a second accommodating cavity 218, which is to say, the second housing 210 may have a second accommodating cavity 218. The adsorbent layer 230 is disposed in the second accommodating cavity 218, and each of the second gas inlet 221, the second gas outlet 222, and the desorption gas outlet 223 may be in communication with the second accommodating cavity 218.

The second gas inlet 221 may be disposed on the third end plate 211, the second gas outlet 222 may be disposed on the fourth end plate 212, and the desorption gas outlet 223 may be disposed on at least one of the second enclosure plate 217 and the third end plate 211. Optionally, the desorption gas outlet 223 may be disposed on the lower part of the second enclosure plate 217. For example, the desorption gas outlet 223 may be disposed on the lower part of the second outer side plate 216.

The third end plates 211 of the plurality of adsorption modules 20 are formed integrally, and the fourth end plates 212 of the plurality of adsorption modules 20 are formed integrally. Thus, the structure of the separation device 1 can be further simplified, the integration degree and structural strength of the separation device 1 can be further improved, and the difficulty in assembling of the separation device 1 can be further reduced.

Optionally, the third side plate 213 of one of two second housings 210 adjacent to each other in the first circumferential direction is formed integrally with the fourth side plate 214 of the other of the two second housings 210. In other words, for two second housings 210 adjacent to each other in the first circumferential direction, the third side plate 213 of one second housing 210 is formed integrally with the fourth side plate 214 of the other second housing 210, which is to say, two second housings 210 adjacent to each other in the first circumferential direction can share the same side plate. Thus, the structure of the separation device 1 can be further simplified, the integration degree of the separation device 1 can be further improved, and the structural strength of the separation device 1 can be further improved.

The second inner side plates 215 of the plurality of adsorption modules 20 are located on a third right cylindrical surface or a third regular prismatic surface, which is to say, the second inner side plates 215 of the plurality of adsorption modules 20 are located on the same right cylindrical surface or the same regular prismatic surface. The second outer side plates 216 of the plurality of adsorption modules 20 are located on a fourth right cylindrical surface or a fourth regular prismatic surface, which is to say, the second outer side plates 216 of the plurality of adsorption modules 20 are located on the same right cylindrical surface or the same regular prismatic surface. Thus, the structure of the separation device 1 is more reasonable. Further optionally, the first right cylindrical surface and the third right cylindrical surface may be the same right cylindrical surface, the second right cylindrical surface and the fourth right cylindrical surface may be the same right cylindrical surface, the first regular prismatic surface and the third regular prismatic surface may be the same regular prismatic surface, and the second regular prismatic surface and the fourth regular prismatic surface may be the same regular prismatic surface.

Optionally, the second inner side plates 215 of the plurality of adsorption modules 20 may be formed integrally, and the second outer side plates 216 of the plurality of adsorption modules 20 may be formed integrally. Thus, the structure of the separation device 1 can be further simplified, the integration degree of the separation device 1 can be further improved, and the structural strength of the separation device 1 can be further improved.

In a first example of the present invention, the separation device 1 may comprise a plurality of gas intake modules 30, and the third gas outlets 321 of the plurality of gas intake modules 30 are in communication with the first gas inlets 121 of the plurality of membrane separation modules 10 in one-to-one correspondence. That is to say, the quantity of the gas intake modules 30 is equal to the quantity of the membrane separation modules 10, the third gas outlet 321 of each gas intake module 30 is in communication with the first gas inlet 121 of a membrane separation module 10, and the first gas inlet 121 of each membrane separation module 10 is in communication with the third gas outlet 321 of a gas intake module 30.

In a second example of the present invention, the gas intake module 30 comprises a gas intake manifold, a control valve, and a plurality of gas intake branch pipes. The control valve has a third gas inlet 323 and a plurality of third gas outlets 321, and the gas intake manifold is connected with the third gas inlet 323. The third gas inlet 323 is switchably in communication with any of the plurality of third gas outlets 321, which is to say, the third gas inlet 323 can be in communication with each third gas outlet 321, the third gas inlet 323 can only be in communication with some of the plurality of third gas outlets 321 at a time but can't be in communication with all of the third gas outlets 321 at the same time. For example, five third gas outlets 321 may be provided, and the third gas inlet 323 may be switched from a state in which it is in communication with the first one among the third gas outlets 321 to a state in which it is in communication with at least one of the third one and the fourth one among the third gas outlets 321.

The first ends of the plurality of gas intake branch pipes are connected with the plurality of third gas outlets 321 in one-to-one correspondence, and the second ends of the plurality of gas intake branch pipes are connected with the first gas inlets 121 of the plurality of membrane separation modules 10 in one-to-one correspondence. Thus, the raw gas can enter into the first housing 110 of a corresponding membrane separation module 10 through the gas intake manifold, the control valve, and the corresponding gas intake branch pipe sequentially.

As shown in FIGS. 2a-2c, in a third example of the present invention, the gas intake module 30 comprises a gas intake pipe 310 and a gas distribution plate 320, the gas intake pipe 310 has a fourth gas outlet 311, and the circumferential direction of the gas distribution plate 320 may be consistent with the first circumferential direction. The gas distribution plate 320 has a plurality of buffer cavities 322, a plurality of third gas inlets 323, and a plurality of third gas outlets 321, wherein the plurality of third gas inlets 323 are in communication with the plurality of buffer cavities 322 in one-to-one correspondence, and the plurality of third gas outlets 321 are in communication with the plurality of buffer cavities 322 in one-to-one correspondence. Optionally, the top end of the gas intake pipe 310 is closed.

The plurality of third gas outlets 321 are in communication with the first gas inlets 121 of the plurality of membrane separation modules 10 in one-to-one correspondence. The fourth gas outlet 311 is switchably in communication with any of the plurality of third gas inlets 323, which is to say, the fourth gas outlet 311 can be in communication with each third gas inlet 323, the fourth gas outlet 311 can only be in communication with some of the plurality of third gas inlets 323 at a time but can't be in communication with all of the third gas inlets 323 at the same time. For example, five third gas inlets 323 may be provided, and the fourth gas outlet 311 may be switched from a state in which it is in communication with the first one among the third gas inlets 323 to a state in which it is in communication with at least one of the third one and the fourth one among the third gas inlets 323.

When the separation device 1 is used to prepare high-purity gas, the fourth gas outlet 311 of the gas intake pipe 310 is set to be in communication with the third gas inlets 323 of a group of buffer cavities 322 of the gas distribution plate 320, so as to supply raw gas to the group of membrane separation modules 10, wherein, the group of buffer cavities 322 comprise at least one buffer cavity 322, and the group of membrane separation modules 10 comprise at least one membrane separation module 10.

The group of membrane separation modules 10 are utilized to carry out separation of the raw gas so as to obtain coarsely purified gas. In other words, one membrane separation module 10 may be utilized to carry out separation of the raw gas, or a plurality of membrane separation modules 10 may be utilized to carry out separation of the raw gas at the same time. Then, a group of adsorption modules 20 are utilized to absorb the impurities in the coarsely purified gas so as to obtain high-purity gas, wherein the group of adsorption modules 20 comprise at least one adsorption module 20; wherein, at least one adsorption module 20 in the group of adsorption modules 20 are in gas communication with at least one membrane separation module 10 in the group of membrane separation modules 10 in one-to-one correspondence.

After the group of adsorption modules 20 operate for a preset time period or after the group of adsorption modules 20 process a preset amount of coarsely purified gas, the fourth gas outlet 311 of the gas intake pipe 310 is set to be in communication with the third gas inlets 323 of another group of buffer cavities 322 of the gas distribution plate 320, for example, by rotating the gas intake pipe 310, so as to supply the raw gas to another group of membrane separation modules 10; wherein said another group of buffer cavities 322 comprise at least one buffer cavity 322, and said another group of membrane separation modules 10 comprise at least one membrane separation module 10.

Said another group of membrane separation modules 10 are utilized to carry out separation of the raw gas so as to obtain the coarsely purified gas. That is to say, one membrane separation module 10 may be utilized to carry out separation of the raw gas, or a plurality of membrane separation modules 10 may be utilized to carry out separation of the raw gas at the same time. Then, another group of adsorption modules 20 are utilize to absorb the impurities in the coarsely purified gas so as to obtain high-purity gas, wherein said another group of adsorption modules 20 comprise at least one adsorption module 20; wherein at least one adsorption module 20 in said another group of adsorption modules 20 is in gas communication with at least one membrane separation module 10 in said another group of membrane separation modules 10 in one-to-one correspondence.

The adsorbent in the group of adsorption modules 20 is regenerated, so that the group of adsorption modules 20 can be used for adsorbing the impurities in the coarsely purified gas again; wherein, the adsorbent in the group of adsorption modules 20 may be regenerated at the same time while another group of adsorption modules 20 are utilized to absorb the impurities in the coarsely purified gas; alternatively, the adsorbent in the group of adsorption modules 20 may be regenerated at the same time while other adsorption modules 20 are utilized to absorb the impurities in the coarsely purified gas or at some other time; wherein, the adsorption modules 20 may be regenerated in a known way.

Thus, the plurality of adsorption modules 20 of the separation device 1 are configured to absorb (operate) and be regenerated in turns, and the plurality of membrane separation modules 10 are configured to operate in turns. That is to say, the adsorption modules 20 are configured to operate and be regenerated cyclically and the membrane separation modules 10 are configured to operate cyclically, so that the separation device 1 can prepare high-purity gas continuously and thereby the operation time of the separation device 1 can be prolonged and the gas processing capacity of the separation device 1 in unit time can be improved.

As shown in FIGS. 2*a* and 2*b*, the gas distribution plate 320 is in an annular shape, i.e., the gas distribution plate 320 has an inner circumferential face, an outer circumferential face, and a central hole, and a plurality of third gas inlets 323 are arranged on the inner circumferential face of the gas distribution plate 320. The gas distribution plate 320 can be sleeved on the portion of the gas intake pipe 310 that is provided with the fourth gas outlet 311, i.e., the portion of the gas intake pipe 310 that is provided with the fourth gas outlet 311 can be located in the center hole of the gas distribution plate 320. Thus, the fourth gas outlet 311 can be located in the center hole of the gas distribution plate 320, i.e., the fourth gas outlet 311 can be located on the inner side of the inner circumferential face of the gas distribution plate 320, so that the fourth gas outlet 311 can be switchably in communication with any of the plurality of third gas inlets 323.

The gas intake pipe 310 can be arranged rotatably with respect to the gas distribution plate 320, and the fourth gas outlet 311 can be switched by rotating the gas intake pipe 310, so that the fourth gas outlet 311 can be in communication with different third gas inlets 323. Specifically, a driving device may be utilized to drive the gas intake pipe 310 to rotate. The driving device that is utilized to drive the gas intake pipe 310 to rotate may be an electric motor or belt, etc.

The expression "the gas distribution plate 320 can be sleeved on the portion of the gas intake pipe 310 that is provided with the fourth gas outlet 311" refers to that the gas distribution plate 320 is sleeved on the portion of the gas intake pipe 310 that is provided with the fourth gas outlet 311 when the separation device 1 is utilized to prepare high-purity gas. The expression "the gas intake pipe 310 can be arranged rotatably with respect to the gas distribution plate 320" refers to that the gas intake pipe 310 can be arranged rotatably with respect to the gas distribution plate 320 when the separation device 1 is utilized to prepare high-purity gas. When the separation device 1 is not used to prepare high-purity gas, the gas distribution plate 320 may or may not be sleeved on the portion of the gas intake pipe 310 that is provided with the fourth gas outlet 311.

As shown in FIGS. 2*a* and 2*c*, each third gas outlet 321 comprises a plurality of gas sub-outlets 3211, the plurality of gas sub-outlets 3211 form a plurality of gas sub-outlet groups that may be disposed at an interval in the circumferential direction of the gas distribution plate 320. Each gas sub-outlet group comprises a plurality of gas sub-outlets 3211, and the plurality of gas sub-outlets 3211 of each gas sub-outlet group are disposed at an interval in the radial direction of the gas distribution plate 320.

Each membrane separation module 10 has a plurality of first gas inlets 121, and the plurality of first gas inlets 121 of each membrane separation module 10 are in communication with the plurality of gas sub-outlets 3211 of the corresponding third gas outlets 321 in one-to-one correspondence. Optionally, the plurality of first gas inlets 121 of each membrane separation module 10 may form a plurality of gas inlet groups, the plurality of gas inlet groups may be arranged at an interval in the circumferential direction of the gas distribution plate 320. Each gas inlet group comprises a plurality of first gas inlets 121, and the plurality of first gas inlets 121 of each gas inlet group are arranged at an interval in the radial direction of the gas distribution plate 320. Further optionally, the plurality of first gas inlets 121 of each membrane separation module 10 are opposite to the plurality of gas sub-outlets 3211 of the corresponding third gas outlets 321 in the axial direction (e.g., vertical direction) of the gas distribution plate 320, so as to be in communication with them in a better way.

As shown in FIGS. 2*a*-2*c*, the gas distribution plate 320 comprises a first plate body 324 and a second plate body 325, wherein the first plate body 324 is in an annular shape, i.e., the first plate body 324 has an inner circumferential face, an outer circumferential face, and a central hole. The first plate body 324 has a first end face 3241 (e.g., top end face), and a plurality of buffer cavities 322 are arranged on the first end face 3241.

The inner end of the buffer cavity 322 is open to form the third gas inlet 323, or the inner side wall face of the buffer cavity 322 is provided with the third gas inlet 323. The inner end of the buffer cavity 322 refers to the end of the buffer cavity 322 adjacent (oriented) to the central part (central hole) of the first plate body 324, and the inner side wall face of the buffer cavity 322 refers to the side wall face of the buffer cavity 322 adjacent (oriented) to the central part (central hole) of the first plate body 324. That is to say, the inner end of each buffer cavity 322 may be open so as to form a plurality of third gas inlets 323, or the inner side wall face of each buffer cavity 322 is provided with the third gas inlets 323; alternatively, the inner ends of some of the plurality of buffer cavities 322 may be open so as to form the third gas inlets 323, while the inner side wall faces of the others of the plurality of buffer cavities 322 are provided with the third gas inlets 323.

Wherein, the first plate body 324 can be sleeved on the portion of the gas intake pipe 310 that is provided with the fourth gas outlet 311, i.e., the portion of the gas intake pipe 310 that is provided with the fourth gas outlet 311 can be located in the central hole of the first plate body 324. Thus, the fourth gas outlet 311 can be located in the central hole of the first plate body 324, i.e., the fourth gas outlet 311 can be located on the inner side of the inner circumferential face of the first plate body 324, so that the fourth gas outlet 311 can be switchably in communication with any of the plurality of third gas inlets 323.

The gas intake pipe 310 can be arranged rotatably with respect to the first plate body 324, and the fourth gas outlet 311 can be switched by rotating the gas intake pipe 310, so that the fourth gas outlet 311 can be in communication with different third gas inlets 323.

The expression "the first plate body 324 can be sleeved on the portion of the gas intake pipe 310 that is provided with the fourth gas outlet 311" refers to that the first plate body 324 is sleeved on the portion of the gas intake pipe 310 that is provided with the fourth gas outlet 311 when the separation device 1 is utilized to prepare high-purity gas. When the separation device 1 is not used to prepare high-purity gas, the first plate body 324 may or may not be sleeved on the portion of the gas intake pipe 310 that is provided with the fourth gas outlet 311.

The second plate body 325 is disposed on the first end face 3241, and covers the plurality of buffer cavities 322. The third gas outlets 321 are disposed on the second plate body 325 and penetrate through the second plate body 325 in the thickness direction (axial direction) of the second plate body 325. For example, the third gas outlets 321 penetrate through the second plate body 325 in the vertical direction. Thus, the processing difficulty of the buffer cavities 322, the third gas inlets 323, and the third gas outlets 321 can be reduced, thereby the processing difficulty and processing cost of the separation device 1 can be reduced.

Optionally, the second plate body 325 may be formed integrally with the first end plates 111 of the plurality of first housings 110. Thus, the structure of the separation device 1 can be further simplified, the integration degree and structural strength of the separation device 1 can be further improved, and the difficulty in assembling of the separation device 1 can be further reduced.

Optionally, the second end plates 112 of the plurality of first housings 110 may be formed integrally with the third end plates 211 of the plurality of second housings 210. Thus, the structure of the separation device 1 can be further simplified, the integration degree and structural strength of the separation device 1 can be further improved, and the difficulty in assembling of the separation device 1 can be further reduced.

The gas distribution plate 320 may further comprise a first plate body, a second plate body, and a third plate body, wherein both the first plate body and the third plate body may be in an annular shape. The first plate body has a first end face (e.g., top end face) and a second end face (e.g., bottom end face) that are opposite to each other in the thickness direction of the first plate body, and the first plate body is provided with a plurality of buffer cavities 322, each of which penetrates through the first plate body in the thickness direction (e.g., vertical direction) of the first plate body. The inner end of each buffer cavity 322 is open so as to form the third gas inlet 323 or the inner side wall face of the buffer cavity 322 is provided with the third gas inlet 323.

The second plate body is arranged on the first end face, the third plate body is arranged on the second end face, and the second plate body and the third plate body cover the plurality of buffer cavities 322. The third gas outlets 321 are disposed on the second plate body and penetrate through the second plate body in the thickness direction (axial direction) of the second plate body. For example, the third gas outlets 321 penetrate through the second plate body in the vertical direction. Thus, the processing difficulty of the buffer cavities 322, the third gas inlets 323, and the third gas outlets 321 can be reduced, thereby the processing difficulty and processing cost of the separation device 1 can be reduced.

The first plate body can be sleeved on the portion of the gas intake pipe 310 that is provided with the fourth gas outlet 311, and the gas intake pipe 310 can be arranged rotatably with respect to the first plate body. The fourth gas outlet 311 can be switched by rotating the gas intake pipe 310, so that the fourth gas outlet 311 can be in communication with different third gas inlets 323. Optionally, the third plate body may be sleeved on the portion of the gas intake pipe 310 that is provided with the fourth gas outlet 311, and the gas intake pipe 310 can be arranged rotatably with respect to the third plate body. Thus, the structure of the gas intake module 30 is more reasonable. As shown in FIG. 1, in a specific example of the present invention, the separation device 1 further comprises a central shaft 40, the plurality of membrane separation modules 10 may be disposed in the circumferential direction of the central shaft 40, and the plurality of adsorption modules 20 may be arranged in the circumferential direction of the central shaft 40. In other words, the plurality of membrane separation modules 10 may be arranged around the central shaft 40, and the plurality of adsorption modules 20 may be arranged around the central shaft 40; wherein the circumferential direction of the central shaft 40 may be consistent with the first circumferential direction. For example, the circumferential direction of the central shaft 40, the first circumferential direction, and the circumferential direction of the gas distribution plate 320 (the first plate body 324) may be consistent with each other.

The first inner side plate 115 of the membrane separation module 10 is adjacent to the central shaft 40 or the first inner side plate 115 of the membrane separation module 10 may be in contact with the central shaft 40. That is to say, the first inner side plate 115 of each membrane separation module 10 may be adjacent to the central shaft 40, or the first inner side plate 115 of each membrane separation module 10 may be in contact with the central shaft 40; alternatively, some of the first inner side plates 115 of the plurality of membrane separation modules 10 may be adjacent to the central shaft 40, and the others of the first inner side plates 115 of the plurality of membrane separation modules 10 may be in contact with the central shaft 40.

The second inner side plate 215 of each adsorption module 20 is adjacent to the central shaft 40 or the second inner side plate 215 of each adsorption module 20 may be in contact with the central shaft 40. That is to say, the second inner side plate 215 of each adsorption module 20 may be adjacent to the central shaft 40, or the second inner side plate 215 of each adsorption module 20 may be in contact with the central shaft 40; alternatively, some of the second inner side plates 215 of the plurality of adsorption modules 20 may be adjacent to the central shaft 40, and the others of the second inner side plates 215 of the plurality of adsorption modules 20 may be in contact with the central shaft 40.

By providing the central shaft 40, the plurality of the membrane separation modules 10 and the plurality of the adsorption modules 20 can be arranged around the central shaft 40, so that the plurality of membrane separation modules 10 and the plurality of adsorption modules 20 can be installed and serviced quickly.

The expression "the plurality of membrane separation modules 10 may be arranged in the circumferential direction of the central shaft 40" refers to that the plurality of membrane separation modules 10 are arranged in the circumferential direction of the central shaft 40 just after the plurality of membrane separation modules 10 are installed. Before the plurality of membrane separation modules 10 are installed, after the plurality of membrane separation modules 10 are installed, and when the separation device 1 is utilized to prepare high-purity gas, the plurality of membrane separation modules 10 may be arranged in the circumferential direction of the central shaft 40, or the central shaft 40 may be removed so that the central shaft 40 is detached from the plurality of membrane separation modules 10.

The expression "the plurality of adsorption modules 20 may be arranged in the circumferential direction of the central shaft 40" refers to that the plurality of adsorption modules 20 are arranged in the circumferential direction of the central shaft 40 just after the plurality of adsorption modules 20 are installed. Before the plurality of adsorption modules 20 are installed, after the plurality of adsorption modules 20 are installed, and when the separation device 1 is utilized to prepare high-purity gas, the plurality of adsorption modules 20 may be arranged in the circumferential direction of the central shaft 40, or the central shaft 40 may be removed so that the central shaft 40 is detached from the plurality of adsorption modules 20.

Optionally, as shown in FIG. 1, the first end plates 111 of the plurality of membrane separation modules 10 are formed integrally so as to form a base plate, the base plate is provided with a mounting hole, and an end (e.g., bottom end) of the central shaft 40 can be fitted in the mounting hole.

Figure 6:
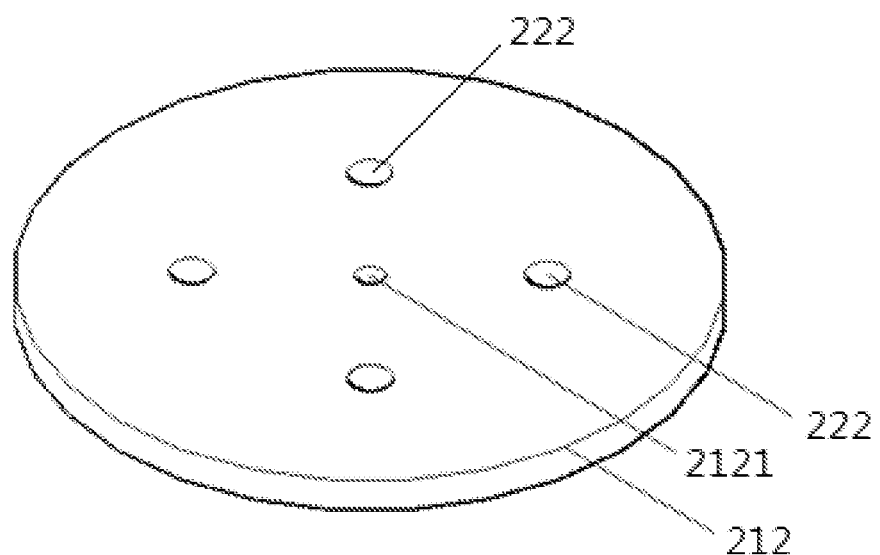
FIG. 6 is a schematic structural diagram of the fourth end plate of the adsorption module according to the embodiments of the present invention.

The expression "an end of the central shaft 40 can be fitted in the mounting hole" refers to that the end of the central shaft 40 is fitted in the mounting hole when the plurality of membrane separation modules 10 and/or the plurality of adsorption modules 20 are installed and just after the plurality of membrane separation modules 10 and/or the plurality of adsorption modules 20 are installed. Before the plurality of membrane separation modules 10 and/or the plurality of adsorption modules 20 are installed, after the plurality of membrane separation modules 10 and/or the plurality of adsorption modules 20 are installed, and when the separation device 1 is utilized to prepare high-purity gas, the end of the central shaft 40 can be fitted in the mounting hole or disengaged from the mounting hole. As shown in FIG. 6, the fourth end plate 212 is provided with a through-hole 2121, and the central shaft 40 can pass through the through-hole 2121.

Optionally, the central axis of the plurality of membrane separation modules 10 may coincide with the central axis of the plurality of adsorption modules 20, i.e., the plurality of the membrane separation modules 10 and the plurality of adsorption modules 20 may be coaxial.

The present invention discloses a device for preparing high-purity gas (a separation device 1). The overall structure of the device is in a cylindrical or regular polygonal shape; in the gas flow direction, the device comprises a raw gas control distributor, a membrane separation module, an adsorption separation module, and a product gas controller sequentially. In the present invention, a membrane separation device and an adsorption separation device are integrated by designing the raw gas control distributor, the membrane separation module, and the adsorption separation module into modules; utilizing a layered design of the raw gas control distributor and program control of the rotation of the gas intake pipe, the raw gas is controlled to pass through the membrane separation module and the adsorption separation module sequentially. In the present invention, the membrane separation module and the adsorption separation module operate and are regenerated cyclically, thus the characteristics and purification function of the membrane and the adsorbent bed layer are given full play.

A device for preparing high-purity gas, with an overall structure in a cylindrical shape or regular polygonal shape; in the gas flow direction, the device comprises a raw gas control distributor, a membrane separation module, an adsorption separation module, and a product gas controller sequentially.

The raw gas control distributor comprises a raw gas intake pipe, a raw gas buffer plate, and a raw gas distribution plate; the end face of the gas intake side of the raw gas buffer plate is an enclosed structure, and the gas outlet side comprises $2n$ buffer areas, where n is an integer; the buffer areas are in a slot shape on the buffer plate respectively, each buffer area is arranged around the center of a column or regular polygon, and has an opening oriented to the center for receiving the raw gas from the raw gas intake pipe; the raw gas intake pipe penetrates through the raw gas buffer plate; the raw gas intake pipe has an opening in the pipe wall penetrating through the raw gas buffer plate (part), and the opening corresponds to the opening in the raw gas buffer area; the raw gas distribution plate covers and is fixedly connected with the end face of the gas outlet side of the raw gas buffer plate, so that the raw gas buffer area is divided into $2n$ areas isolated from each other, and the raw gas can enter into corresponding membrane block units through the through-holes in the distribution plate.

The membrane separation module comprises a membrane separation housing, membrane tube supporting plates at the two sides, several membrane tube assemblies fixed between the membrane tube supporting plates, and membrane tube assembly partition plates that divide the membrane tube assemblies into $2n$ membrane block units, which correspond to the $2n$ raw gas buffer areas in the vertical direction.

The adsorption separation module comprises an adsorption separation module housing, an adsorbent module distribution plate, an adsorbent bed layer, and adsorption area partition plates that divide the adsorbent bed layer into $2n$ adsorption units, which correspond to the $2n$ membrane block units in the vertical direction; the other end of the adsorbent bed layer is fixedly connected with the product gas controller.

The product gas controller has a platy structure with $2n$ product gas outlets distributed thereon; the $2n$ product gas outlets correspond to and are in communication with the catalyst bed layers of the adsorption units respectively.

The membrane tube supporting plate at the gas intake side of the membrane separation module has the same components or structure as the raw gas distribution plate.

The raw gas intake pipe is in a flexible connection with the raw gas buffer plate, and can rotate.

The width of the top opening of the raw gas intake pipe is not greater than the width of the opening of the corresponding to buffer area at the center of circle.

The device further comprises a driving device configured to drive the raw gas intake pipe to rotate in accordance with a procedure.

The membrane separation module is coaxial with the adsorption separation module.

The membrane separation housing is provided with a retentate gas discharge outlet at positions corresponding to the $2n$ membrane block units respectively.

The raw gas distribution plate has several through-holes distributed thereon, and the through-holes are divided into $2n$ areas, which correspond to $2n$ membrane separation modules respectively.

The membrane tube supporting plate at the gas intake side of the membrane separation module has several holes distributed thereon, and the holes are divided into $2n$ areas, which correspond to and are in communication with $2n$ adsorption separation units.

The adsorption separation module housing is provided with a desorption gas discharge outlet at positions corresponding to the $2n$ adsorption units respectively.

The device further comprises a central shaft, wherein the membrane separation module, the adsorption separation module, and the product gas controller are sleeved on the central shaft respectively.

The membrane separation module housing and the adsorption separation module housing are a cylindrical structure respectively.

The end of the raw gas intake pipe is closed.

The $2n$ openings of the buffer areas oriented to the center are isolated from and not in communication with each other.

The membrane tube supporting plate at the gas outlet side of the membrane separation module has the same assembly as the adsorbent module distribution plate.

The present invention provides a device for preparing high-purity gas, which integrates membrane separation technique and adsorption separation technique, and incorporates innovation of the device structure and process of the techniques.

The technical scheme of the present invention is as follows:

A device for preparing high-purity gas, with an overall structure in a cylindrical shape or regular polygonal shape; in the direction from the raw gas to the product gas, the device comprises a raw gas control distributor, a membrane separation module, an adsorption separation module, and a product gas controller sequentially.

The raw gas control distributor comprises a raw gas intake pipe, a raw gas buffer plate, and a raw gas distribution plate; the end face of the gas intake side of the raw gas buffer plate is an enclosed structure, and the gas outlet side comprises $2n$ buffer areas, where n is an integer; the buffer areas are in a slot shape on the buffer plate, are arranged around the center of a cylinder or regular polygon, and has openings oriented to the center ($2n$ openings that are isolated from and not in communication with each other) for receiving the raw gas from the raw gas intake pipe; the raw gas intake pipe penetrates through the raw gas buffer plate; the raw gas intake pipe has an opening in the pipe wall penetrating through the raw gas buffer plate (part), and the opening corresponds to the opening in the raw gas buffer area; the raw gas distribution plate covers and is fixedly connected with the end face of the gas output side of the raw gas buffer plate, so that the raw gas buffer area is divided into $2n$ areas isolated from each other, and the raw gas can enter into corresponding membrane block units through the through-holes in the distribution plate;

The membrane separation module comprises a membrane separation housing, membrane tube supporting plates at the two sides, several membrane tube assemblies fixed between the membrane tube supporting plates, and membrane tube assembly partition plates that divide the membrane tube assemblies into $2n$ membrane block units, which correspond to the $2n$ raw gas buffer areas in the vertical direction;

The adsorption separation module comprises an adsorption separation module housing, a supporting plate, an adsorbent bed layer, and adsorption area partition plates that divide the adsorbent bed layer into $2n$ adsorption units, the $2n$ adsorption units correspond to the $2n$ membrane block units in the vertical direction; the other end of the adsorbent bed layer is fixedly connected with the product gas controller;

The product gas controller has a platy structure with $2n$ product gas outlets distributed thereon; the $2n$ product gas outlets correspond to and are in communication with the absorbent bed layers of the adsorption units respectively.

Furthermore, the raw gas intake pipe is in a flexible connection with the raw gas buffer plate, and can rotate. Therefore, the device in the present invention may further comprise a driving device, which is fixedly connected with the raw gas intake pipe so as to drive the raw gas intake pipe to rotate or stop according to a preset procedure.

The area of the top opening of the raw gas intake pipe is not greater than the area of the raw gas receiving opening of the corresponding buffer area on the buffer plate. The end of the raw gas intake pipe is closed and flush with the end face of the gas outlet end of the raw gas buffer plate.

The raw gas distribution plate has several through-holes distributed thereon, and the through-holes are divided into $2n$ areas, which correspond to $2n$ membrane separation modules respectively. The through-holes in the raw gas distribution plate usually are in fan-shaped distribution for uniformly distributing the raw gas flowing through the buffer areas into the membrane separation modules.

The membrane tube supporting plate at the gas intake side of the membrane separation module has several holes distributed thereon, and the holes are divided into $2n$ areas, which correspond to and are in communication with $2n$ raw gas distribution buffer areas.

In the membrane separation module, the membrane tube supporting plate at the gas intake side of the membrane separation module has the same components or structure as the raw gas distribution plate.

The membrane separation module housing is provided with a retentate gas discharge outlet at positions corresponding to the $2n$ membrane block units respectively.

The membrane separation module housing and the adsorption separation module housing have a cylindrical or regular polygonal structure respectively. The membrane separation module is coaxial with the adsorption separation module.

The membrane separation module is configured to carry out coarse purification of the raw gas. The membrane assembly provided on the membrane separation module may employ an inorganic membrane or organic membrane. An inorganic membrane assembly is applicable to scenarios that the raw gas contains liquid or acid gas, or condensate may be produced during temperature and/or pressure change. The inorganic membrane may be a hollow molecular sieve membrane, such as carbon molecular sieve, LTA molecular sieve or DDR molecular sieve membrane, etc. An organic membrane is applicable to scenarios that the raw gas doesn't contain liquid and no condensate will be generated in the raw gas or product gas during temperature and/or pressure change. The organic membrane usually is a hollow fiber membrane.

In the membrane separation module, the hollow molecular sieve membrane tubes are encapsulated in a cylindrical housing, the bottom end of which is connected with a gas control distributor for distributing the gas entering into the membrane separation module; the molecular sieve membrane tubes are divided evenly into $2n$ blocks, each of which contains the same quantity of hollow molecular sieve membrane tubes.

The adsorption separation module housing is provided with a desorption gas discharge outlet at positions corresponding to $2n$ adsorption units respectively for discharging the desorption gas in a desorption procedure.

In the adsorption separation module, the adsorbent is encapsulated in a cylindrical housing. The bottom end of the cylindrical housing is connected with the top end of the membrane separation module, a gas distribution plate having a structure similar to the structure of the raw gas distribution plate is arranged at the joint, and the top end of the cylindrical housing is connected with the product gas controller. The adsorbent is usually divided into $2n$ blocks, each of which has the same gas processing capacity.

The quantity of the molecular sieve membrane tube blocks evenly divided in the membrane separation module is equal to the quantity of the adsorbent blocks evenly divided in the adsorption separation module.

The adsorption separation module is configured to further purify the coarsely purified gas obtained by membrane separation to obtain high-purity gas. The adsorption separation module may be filled with adsorbents for absorbing various impurities in layers according to the composition of the impurities in the coarsely purified gas, and the adsorbents usually comprise activated alumina, silica gel, zeolite molecular sieve, and activated carbon, etc.

Furthermore, the product gas controller has a platy structure with $2n$ product gas outlets distributed thereon, which correspond to and are in communication with the adsorbent bed layers of the adsorption units respectively. The product gas outlets are configured to control the discharging of the product gas and the pressure in the adsorbent bed layers.

The device provided by the present invention may further comprise a central shaft, and the membrane separation module, the adsorption separation module and the product gas controller are sleeved on the central shaft through a central shaft mounting hole respectively. The central shaft is provided to facilitate quick installation and service of the preparing device.

The device for preparing high-purity gas in the present invention can be widely applied in the field of high-purity gas preparation. For example, it may be used to prepare high-purity argon, hydrogen, oxygen, nitrogen, carbon monoxide, carbon dioxide, and methane, etc.

Compared with the prior art, the device for preparing high-purity gas in the present invention has the following advantages:
1. Integration of membrane separation and adsorption separation techniques and devices is realized by means of modular design of the raw gas control distributor, the membrane separation module, and the adsorption separation module.
2. Utilizing a layered design of the raw gas control distributor and program control of the rotation of the gas intake pipe, the raw gas is controlled to pass through the membrane separation module and the adsorption separation module sequentially. In addition, the membrane separation module and the adsorption separation module operate and are regenerated cyclically, thus the characteristics and purification function of the membrane and the adsorbent bed layer are given full play.
3. With integrated innovative design of membrane separation and adsorption separation, the footprint and weight of the device are effectively reduced, and economic and efficient device and technique are provided for preparing high-purity gas.

Hereunder the device for preparing high-purity gas in the present invention will be further detailed with reference to the accompanying drawings. As shown in FIGS. 1-6, the present invention provides a device for preparing high-purity gas, which comprises a gas intake pipe 310, a gas distribution plate 320, a membrane separation module 10, an adsorption module 20, a product gas controller, and a central shaft 40.

The gas distribution plate 320 comprises a first plate body 324 and a second plate body 325. The first plate body 324 is provided with slot-type buffer cavities 322, and the slots have third gas inlets 323 that are oriented to the central axis for receiving raw gas from the gas intake pipe 310 (the quantity of the third gas inlets 323 is equal to the quantity of the buffer cavities 322, and the third gas inlets 323 and the buffer cavities 322 are isolated from each other), and the second plate body 325 is provided with third gas outlets 321 that penetrate through the second plate body 325.

The second plate body 325 covers the first plate body 324, so that the raw gas can only enter into the buffer cavities 322 through the third gas inlet 323, and then is uniformly distributed from the buffer cavities 322 into the membrane separation module 10 through the third gas outlets 321 on the second plate body 325.

The third gas outlets 321 are generally arranged in a fan shape, so that the raw gas can be uniformly distributed outside the membrane tubes of the membrane separation module 10.

The gas intake pipe 310 is located at the central axis, and a fourth gas outlet 311 is provided on the gas intake pipe 310 for distributing the raw gas to the buffer cavities 322 through the third gas inlets 323. Only when the fourth gas outlet 311 corresponds to one third gas inlet 323, the raw gas enters into the corresponding buffer cavity 322, and then enters into the corresponding membrane separation module 10 and adsorption module 20 sequentially. There is no raw gas entering into any buffer cavity 322 that doesn't correspond to the fourth gas outlet 311.

The membrane separation module 10 comprises a membrane assembly 130, membrane assembly partition plates 113 and 114, membrane assembly mounting housings 115 and 116, a membrane tube supporting plate 111 at the gas inlet side, a membrane tube supporting plate 112 at the gas outlet side, and retentate gas outlets 123 located at the bottom of the mounting housings (upper housing) (the quantity of the retentate gas outlets 123 may be equal to the quantity of the membrane separation modules 10). The membrane tube supporting plate 111 at the gas inlet side may employ the same structure as the second plate body 325, and the through-holes arranged in the membrane tube supporting plate 111 may be in one-to-one correspondence to the through-holes (third gas outlets 321) in the second plate body 325. Alternatively, the membrane tube supporting plate 111 at the gas inlet side may employ the same components as the second plate body 325. The membrane tube supporting plate 112 at the gas outlet side is sealingly connected with the edges of the membrane assembly mounting housings 115 and 116, and is provided with several through-holes thereon, which are in one-to-one correspondence to the gas outlets of the membrane assemblies 130.

The adsorption module 20 comprises an adsorbent bed layer 230, adsorbent bed layer partition plates 213 and 214, adsorbent bed layer housings 215 and 216, adsorbent module distribution plates 211, and desorption gas outlets 223 located at the bottom of the adsorbent bed layer housings 215 and 216 (upper housing) (the quantity of the desorption gas outlets 223 is equal to the quantity of the adsorption modules 20). The adsorbent module distribution plate 211 may employ the same structure as the membrane tube supporting plate 112 at the gas outlet side, and the through-holes arranged in the adsorbent module distribution plate 211 are in one-to-one correspondence with the through-holes in the membrane tube supporting plate 112 at the gas outlet side. Alternatively, the adsorbent module distribution plate 211 employs the same components as the membrane tube supporting plate 112 at the gas outlet side.

The product gas controller comprises a product gas outlet and a central shaft mounting hole of the device.

The device for preparing high-purity gas in the present invention comprises a gas intake pipe 310, a gas distribution plate 320, membrane separation modules 10, adsorption modules 20, and a product gas controller 5 sequentially from bottom to top, and all of those components or modules are in a cylindrical or regular polygonal shape, and are installed on the central shaft 40. The central shaft 40 can facilitate quick installation and service of the device.

The membrane separation modules 10 and the adsorption modules 20 are divided into $2n$ blocks (n is an integer and is at least 2) respectively.

The product gas controller is located at the top of the device, and the product gas outlets on the product gas controller are in the same quantity as the adsorption modules 20 and are used to control the discharging of the product gas and the pressure in the adsorbent layers 230 of the adsorption modules 20.

Hereunder the working process of the device for preparing high-purity gas will be described briefly. For example, in a case that four membrane separation modules 10 and four adsorption modules 20 are provided, the operating process of the device for preparing high-purity gas comprises the following steps:

(1) After the device is started, the raw gas enters into the buffer cavities 322 through the gas intake pipe 310, the fourth gas outlet 311 and the third gas inlets 323 that are in communication with each other, and finally enters into the membrane separation modules 10 through the third gas outlets 321 on the second plate body 325. The bottom end of the membrane separation module 10 is sealed, the raw gas enters into the housing of the membrane separation module 10, permeates through the membrane assembly 130 and enters into the membrane tube, wherein the gas that permeates through the membrane tube is coarsely purified gas, while the gas that can't permeate through the membrane tube is retentate gas.

(2) The coarsely purified gas enters into the adsorbent layers 230 of the adsorption modules 20 through a gas distributor similar to the second plate body 325; at that point, the operating adsorption modules 20 correspond to the operating membrane separation modules 10. The high-purity gas obtained in the adsorption modules 20 leaves the device through the product gas outlet.

(3) One a peak value of adsorption is reached in the adsorbent layer 230 of an adsorbent module 20, the gas intake pipe 310 is rotated so that the fourth gas outlet 311 on the gas intake pipe 310 is in communication with the third gas inlet 323 of the next buffer cavity 322; then the steps 1 and 2 are repeated to obtain high-purity gas continuously.

(4) When the raw gas passes through each membrane separation module 10, the retentate gas is discharged from the device through the retentate gas outlet 123 at the same time.

(5) After the adsorption is accomplished in each adsorption module 20, the coarsely purified gas obtained by means of another membrane separation module 10 starts to enter into another adsorption module 20; the pressure in the adsorption module 20 where the adsorption is accomplished starts to drop, and the high-purity product gas absorbed in the bed layer is discharged through the product gas outlet for purging and regeneration of the adsorbent layer 230 after desorption.

(6) After the adsorbent layer 230 releases the absorbed high-purity product gas, the product gas discharge outlet is closed, and the desorption gas outlet 223 is opened, so that the adsorbent layer 230 for which the desorption has been accomplished is purged and regenerated by means of the high-purity product gas absorbed in another adsorbent layer 230 where the adsorption has been accomplished, in order to increase the pressure by means of the product gas and make preparation for the next adsorption cycle.

In the description of the present invention, it should be understood that the orientation or position relations indicated by terms "center", "longitudinal", "transverse", "length", "width", "thickness", "above", "below", "left", "right", "vertical", "horizontal", "top", "bottom", "inside", "outside", "clockwise", "counter-clockwise", "axial", "radial", or "circumferential", etc., are based on the orientation or position relations indicated in the accompanying drawings. They are used only to ease and simplify the description of the present invention, rather than indicating or implying that the involved device or component must have a specific orientation or must be constructed and operated in a specific orientation. Therefore, the use of these terms shall not be deemed as constituting any limitation to the present invention.

In addition, the terms "first" and "second" are used only for description purpose, and shall not be interpreted as indicating or implying relative importance or implicitly indicating the quantity of the indicated technical feature. Hence, a feature confined by "first" or "second" may explicitly or implicitly comprise at least one such feature. In the description of the present invention, "a plurality of" or "multiple" means at least two, such as two or more, etc., unless otherwise specified explicitly. In the present invention, unless otherwise specified and defined explicitly, the terms "install", "connect", "fix", etc. shall be interpreted in their general meaning. For example, the connection may be fixed connection, detachable connection, or integral connection; may be mechanical connection or electrical connection or in communication with each other; may be direct connection or indirect connection via an intermediate medium, or internal communication or interactive relation between two elements. Those having ordinary skills in the art may interpret the specific meanings of the terms in the present invention in their context.

In the present invention, unless otherwise specified and defined explicitly, a first feature "above" or "below" a second feature may represent that the first feature and the second feature directly contact with each other or the first feature and the second feature contact with each other indirectly via an intermediate medium. In addition, a first feature "above" or "over" a second feature may represent that the first feature is right above or diagonally above the second feature, or may only represent that the elevation of the first feature is higher than that of the second feature. A first feature being "below" or "under" a second feature may represent that the first feature is right below or diagonally below the second feature, or may only represent that the elevation of the first feature is lower than that of the second feature.

In the description of the present invention, the expressions of reference terms "an embodiment", "some embodiments", "an example", "specific example", or "some examples" mean that the specific features, structures, materials or characteristics described in those embodiments or examples are included in at least one embodiment or example of the present invention. In this document, the exemplary expression of the above terms may not necessarily refer to the same embodiment or example. Moreover, the specific features, structures, materials, or characteristics described can be combined appropriately in any one or more embodiments or examples. Furthermore, those skilled in the art may combine or assemble different embodiments or examples and features in different embodiments or examples described herein, provided that there is no conflict among them. While the present invention is illustrated and described above in embodiments, it should be understood that the embodiments are exemplary only and shall not be deemed as constituting any limitation to the present invention. Those skilled in the art can made variations, modifications, and replacements to the embodiments within the scope of the present invention.

The invention claimed is:
1. A separation device, comprising:
a membrane separation module comprising a first housing and a membrane assembly disposed in the first housing, wherein the first housing has a first gas inlet, a first gas outlet, and a retentate gas outlet, and the membrane assembly has a permeate gas outlet, the permeate gas outlet being in communication with the first gas outlet;

an adsorption module comprising a second housing and an adsorbent layer disposed in the second housing, wherein the second housing is disposed on the first housing and has a second gas inlet, a second gas outlet, and a desorption gas outlet, and the second gas inlet being is in communication with the first gas outlet; and a gas intake module having a third gas outlet that is in communication with the first gas inlet.

2. The separation device of claim 1, wherein the second housing is directly disposed on the first housing.

3. The separation device of claim 1, wherein the membrane separation module comprises a plurality of first gas inlets, each of the plurality of first gas inlets is in communication with the third gas outlet; optionally, the membrane separation module comprises a plurality of membrane assemblies and a plurality of first gas outlets, the adsorption module comprises a plurality of second gas inlets, wherein the permeate gas outlets of the plurality of membrane assemblies are in communication with the plurality of first gas outlets in one-to-one correspondence, and the plurality of first gas outlets are in communication with the plurality of second gas inlets in one-to-one correspondence.

4. The separation device of claim 1, wherein the gas intake module comprises:
a gas intake pipe having a fourth gas outlet; and
a gas distribution plate having a buffer cavity and a plurality of third gas outlets in communication with the buffer cavity, the fourth gas outlet is in communication with the buffer cavity, wherein the membrane separation module comprises a plurality of first gas inlets, the plurality of third gas outlets are in communication with the plurality of first gas inlets in one-to-one correspondence.

5. A separation system comprising a plurality of separation devices of claim 1, wherein the plurality of separation devices are formed by a plurality of membrane separation modules a plurality of adsorption modules, and a plurality of gas intake modules,
wherein the first gas inlet of each of the membrane separation modules is in communication with a respective third gas outlet, the plurality of second housings are disposed on the plurality of first housings in one-to-one correspondence, and the first gas outlets of the plurality of membrane separation modules are in communication with the second gas inlets of the plurality of adsorption modules in one-to-one correspondence.

6. The separation system of claim 5, wherein the third gas outlets of the plurality of gas intake modules are in communication with the first gas inlets of the plurality of membrane separation modules in one-to-one correspondence.

7. The separation system of claim 5, wherein each gas intake module comprises:
a gas intake manifold;
a control valve having a third gas inlet, and the third gas inlet is switchably in communication with each of the plurality of third gas outlets, wherein the gas intake manifold is connected with the third gas inlet; and
a plurality of gas intake branch pipes, wherein a first end of each of the plurality of gas intake branch pipes is connected with one of the plurality of third gas outlets in one-to-one correspondence, and a second end of each of the plurality of gas intake branch pipes is connected with the first gas inlet of each of the plurality of membrane separation modules in one-to-one correspondence.

8. The separation system of claim 5, wherein each gas intake module comprises:
a gas intake pipe having a fourth gas outlet; and
a gas distribution plate having a plurality of buffer cavities, a plurality of third gas inlets, and a plurality of third gas outlets, the plurality of third gas inlets are in communication with the plurality of buffer cavities in one-to-one correspondence, and the plurality of third gas outlets are in communication with the plurality of buffer cavities in one-to-one correspondence, wherein the fourth gas outlet is switchably in communication with each of the plurality of third gas inlets, and the plurality of third gas outlets are in communication with the first gas inlets of the plurality of membrane separation modules in one-to-one correspondence,
wherein the gas distribution plate is in an annular shape, the plurality of third gas inlets are disposed on the inner circumferential face of the gas distribution plate, wherein the gas distribution plate is sleeved on a portion of the gas intake pipe provided with the fourth gas outlet, and the gas intake pipe is able to be rotatably arranged with respect to the gas distribution plate.

9. The separation system of claim 8, wherein the gas distribution plate comprises:
an annular first plate body having a first end face provided with the plurality of buffer cavities, inner ends of the buffer cavities are open to form the plurality of third gas inlets of the inner circumferential face or inner side wall faces of the buffer cavities connect with the inner circumferential face to provide the plurality of third gas inlets, wherein the first plate body is sleeved on a portion of the gas intake pipe that is provided with the fourth gas outlet, and the gas intake pipe is rotatably arranged with respect to the first plate body; and
a second plate body that is disposed on the first end face and covers the plurality of buffer cavities, the plurality of third gas outlets are disposed on the second plate body and penetrate through the second plate body.

10. The separation system of claim 8, wherein the gas distribution plate comprises:
an annular first plate body having a first end face and a second end face that are opposite to each other, the first plate body is provided with a plurality of buffer cavities, each of which penetrates through the first plate body, and inner ends of the buffer cavities are open to form the plurality of third gas inlets of the inner circumferential face or inner side wall faces of the buffer cavities connect with the inner circumferential face to provide the plurality of third gas inlets; and
a second plate body and an annular third plate body, the second plate body is disposed on the first end face, the third plate body is disposed on the second end face, and the second plate body and the third plate body cover the plurality of buffer cavities, wherein the first plate body is sleeved on the portion of the gas intake pipe that is provided with the fourth gas outlet, the gas intake pipe is rotatably arranged with respect to the first plate body, the plurality of third gas outlets are disposed on the second plate body and penetrate through the second plate body in the thickness direction of the second plate body.

11. The separation system of claim 5, wherein the plurality of membrane separation modules are arranged in a first circumferential direction, and each first housing comprises:
a first end plate and a second end plate; and
a first side plate, a second side plate, a first inner side plate, and a first outer side plate, wherein the first side plate, the first inner side plate, the second side plate, and the first outer side plate are connected sequentially to form a first enclosure plate, a first end of the first enclosure plate is connected with the first end plate, and a second end of the first enclosure plate is connected with the second end plate, wherein a respective first gas inlet is disposed on the first end plate, a respective first gas outlet is disposed on the second end plate, and a respective retentate gas outlet is disposed on at least one of the first enclosure plate and the first end plate.

12. The separation system of claim 11, wherein the plurality of adsorption modules are arranged in a first circumferential direction, and each second housing comprises:
   a third end plate and a fourth end plate; and
   a third side plate, a fourth side plate, a second inner side plate, and a second outer side plate, wherein the third side plate, the second inner side plate, the fourth side plate, and the second outer side plate are connected sequentially to form a second enclosure plate, a first end of the second enclosure plate is connected with the third end plate, and a second end of the second enclosure plate is connected with the fourth end plate, wherein a respective second gas inlet is arranged on the third end plate, a respective second gas outlet is arranged on the fourth end plate, and a respective desorption gas outlet is arranged on at least one of the second enclosure plate and the third end plate.

13. The separation system of claim 12, further comprising a central shaft, wherein the plurality of membrane separation modules are arranged in the circumferential direction of the central shaft, the plurality of adsorption modules are arranged in the circumferential direction of the central shaft, wherein the first inner side plate of the membrane separation module is adjacent to or in contact with the central shaft, the second inner side plate of each adsorption module is adjacent to or in contact with the central shaft.

14. A separation method implemented with the separation device of claim 1, comprising the following steps:
   utilizing the gas intake module to supply raw gas to the membrane separation module;
   utilizing the membrane separation module to carry out separation of the raw gas so as to obtain a first purified gas; and
   utilizing the adsorption module to absorb impurities in the first purified gas so as to obtain a second purified gas.

* * * * *

UNITED STATES PATENT AND TRADEMARK OFFICE
CERTIFICATE OF CORRECTION

PATENT NO. : 11,958,011 B2
APPLICATION NO. : 17/419705
DATED : April 16, 2024
INVENTOR(S) : Shengzhong Zhang et al.

Page 1 of 1

It is certified that error appears in the above-identified patent and that said Letters Patent is hereby corrected as shown below:

On the Title Page

Item (73):
--Assignee: CHINA PETROLEUM & CHEMICAL CORPORATION, Beijing (CN); DALIAN RESEARCH INSTITUTE OF PETROLEUM AND PETROCHEMICALS, CORP., Liaoning (CN)--

Should read:
--Assignee: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)--

Signed and Sealed this
Ninth Day of July, 2024

Katherine Kelly Vidal
*Director of the United States Patent and Trademark Office*